US006765781B2

United States Patent
Togashi

(10) Patent No.: US 6,765,781 B2
(45) Date of Patent: Jul. 20, 2004

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 24 days.

(21) Appl. No.: 10/307,298

(22) Filed: Dec. 2, 2002

(65) Prior Publication Data
US 2003/0102502 A1 Jun. 5, 2003

(30) Foreign Application Priority Data

Dec. 3, 2001 (JP) ...................................... 2001-368548
Dec. 3, 2001 (JP) ...................................... 2001-368549

(51) Int. Cl.⁷ .............................................. H01G 4/228
(52) U.S. Cl. ................. 361/306.3; 361/303; 361/306.1; 361/310
(58) Field of Search .............................. 361/303, 306.1, 361/306.3, 308.1, 309–313, 321.2, 321.3, 321.4, 307

(56) References Cited

U.S. PATENT DOCUMENTS

| 4,590,537 A | * | 5/1986 | Sakamoto ................. 361/306.3 |
| 5,450,278 A | * | 9/1995 | Lee et al. .................... 361/303 |
| 5,835,340 A | * | 11/1998 | Wada et al. .............. 361/321.5 |
| 5,880,925 A | | 3/1999 | DuPre et al. |
| 6,188,565 B1 | * | 2/2001 | Naito et al. .................. 361/303 |
| 6,292,351 B1 | * | 9/2001 | Ahiko et al. ............. 361/306.3 |

FOREIGN PATENT DOCUMENTS

| JP | A 6-140283 | 5/1994 |
| JP | A 8-97070 | 4/1996 |
| JP | A 11-144996 | 5/1999 |
| JP | A 2000-323354 | 11/2000 |

* cited by examiner

Primary Examiner—Anthony Dinkins
(74) Attorney, Agent, or Firm—Oliff & Berridge, PLC

(57) ABSTRACT

A multilayer capacitor having a dielectric body formed by stacking dielectric sheets. At the outside of the dielectric body are arranged a pair of a first terminal electrode and a second terminal electrode insulated from each other and is arranged at least one first linkage electrode insulated from the first terminal electrode and the second terminal electrode. A first internal electrode is stacked inside the dielectric body via dielectric sheets and is connected to the first terminal electrode. A second internal electrode to be connected to the second terminal electrode is further stacked inside the dielectric body via dielectric sheets. A first polarity conductor to be connected to the first internal electrode through an external first linkage electrode is further stacked inside the dielectric body via dielectric sheets.

19 Claims, 23 Drawing Sheets

MULTILAYER CAPACITOR

BACKGROUND OF THE INVENTION

1. Field of the Invention

The present invention relates to a multilayer capacitor capable of greatly reducing the equivalent serial inductance (EBL) and capable of controling the equivalent serial resistance (ESR).

2. Description of the Related Art

In recent years, the central processing units (CPUs) used for data processing apparatuses have remarkably increased in operating frequency due to higher processing speeds and higher integration. On the other hand, reduction of the power consumption has resulted in a remarkably reduction in the operating voltages.

Therefore, in power sources for supplying power to CPUs, there are sharp, large fluctuations due to the load current. It has become extremely difficult to keep fluctuations in the voltage accompanying this to within tolerances of the power source.

Therefore, sometimes a decoupling capacitor is connected in parallel between the power source and CPU. A conventional decoupling capacitor is comprised of a two-terminal structure multilayer ceramic capacitor. At the time of a transient fluctuation in the quickly changeable load current, current in supplied from this multilayer ceramic capacitor to the CPU or other integrated circuit by quick charging and discharging to suppress fluctuation of the power source voltage and stabilize the power source.

Note that in a conventional multilayer ceramic capacitor able to be used for a decoupling capacitor, the internal conductors connected to the external terminal electrodes are stacked via ceramic layers. The directions of currents flowing through the internal conductors have therefore been the same.

Along with the increasingly higher operating frequencies of today's CPUs, however the fluctuations in the load current have become faster and larger. Therefore, the parasitic part of the ESL of the multilayer ceramic capacitor itself obstructs the charge and the discharge, so that it effects on fluctuations of the power source voltage. The effect due to the multilayer ceramic capacitor is therefore becoming insufficient.

That is, in a conventional multilayer ceramic capacitor, since the ESL is high, fluctuation of the power source voltage V easily becomes greater in the same way as above along with fluctuations at the time of charging and discharging accompanying fluctuations in the load current 1. This is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dv = ESL \cdot di/dt \quad (1)$$

where, dV is transitory fluctuation of voltage (V), i is the fluctuation of current (A), and t is the tire of fluctuation (sec)

Further, in a multilayer ceramic capacitor, the ESR is smaller and the high frequency characteristics are better than with an electrolytic capacitor, but advances in materials technology and thick film forming technologies have lad to remarkable advances in reducing the thickness of layers of dielectrics and increasing the number of layers in recant years. As a result, large capacity multilayer ceramic capacitors having large electrostatic capacities comparable with those of aluminum electrolytic capacitors and tantalum electrolytic capacitors have been appearing.

Further, the much greater number of layers of multilayer ceramic capacitors in recent years has not only increased the electrostatic capacity, but also caused a tendency for a further drop in the ESR. That is, the ESR at the time of high frequency fluctuation of the current is predominately due to the electrical resistance of the internal conductors, so when the greater number of layers causes an increase in the density of the internal conductors of the multilayer ceramic capacitor, the ESR is further reduced.

That is, in the equivalent circuit of the multilayer ceramic capacitor, the equivalent resistance of the internal conductors themselves laminated via the ceramic layers are formed at both sides of the capacitor circuit. When the greater number of layers causes an increase in the capacitance of the capacitor circuit, the whole resistance decreases and the ESR is further reduced in inverse proportion to the number of layers.

On the other hand, a large capacity capacitor is mainly used for flattening the output of a switching power source. If using a capacitor with a small ESR, however, while this is effective for reducing the output ripple voltage, when the ESR is overly small, the control system of the switching power source suffers from unstable output voltage or a susceptibility to abnormal oscillation. This in because when using a capacitor with an overly small ESR, the phase easily becomes delayed in the feedback circuit of the control circuit and the control circuit can no longer function normally.

Therefore, in the past, for applications such as flattening the output of the switching power source, often an electrolytic capacitor having a large ESR is used instead of a multilayer capacitor.

As opposed to this, from the standpoints of reducing costs and reducing size, it is desirable to use a multilayer capacitor for such applications as well. A further increase in layers of the multilayer capacitor in pursuit of greater capacity in the future, however, may invite a greater reduction in the ESR and therefore an overly small ESR.

SUMMARY OF THE INVENTION

A first object of the present invention is to provide a multilayer electronic device able to greatly reduce the ESL.

A second object of the present invention is to produce a multilayer capacitor able to be used for various applications by controling the ESR.

To attain the first object, according to a first aspect of the present invention, there is provided a multilayer capacitor comprising at least two of a first internal conductor and a second internal conductor formed in flat shapes, at least two of a first polarity conductor and a second polarity conductor formed in flat shapes, a dielectric body formed by stacking a plurality of dielectric sheets with dielectric sheets sandwiching each of the conductors, a first terminal electrode arranged at an outside of the dielectric body so as to be able to be connected to an external circuit and connected to the first internal conductor, a second terminal electrode arranged at the outside of the dielectric body so as to be able to be connected to the external circuit and connected to the second internal conductor, a first linkage electrode for connecting the first internal conductor and the first polarity conductor at the outside of the dielectric body while creating portions where the directions of currents between the conductors adjoining each other along a stacking direction become opposite to each other, and a second linkage electrode for connecting the first internal conductor and the first polarity conductor at the outside of the dielectric body while creating portions where the directions of currents between the conductors adjoining each other along the stacking direction become opposite to each other.

According to the multilayer capacitor according to the first aspect of the present invention, the dielectric body is formed by stacking a plurality of dielectric sheets with each dielectric sheet sandwiched between two first and second internal conductors and two types of first and second polarity conductors formed in flat shapes. Two first and second terminal electrodes arranged at the outside of the dielectric body so as to enable connection to an external circuit are connected to the first and second internal conductors.

The first internal conductor and first polarity electrode are connected by a first linkage electrode and become the same polarity. Further, the second internal conductor and second polarity electrode are connected by a second linkage electrode and become the own polarity. Further, portions where the directions of the current become opposite between these conductors adjoining each other along the stacking direction are created.

Therefore, there is the action that the magnetic fields are canceled out at locations where the currents flow in opposite directions. Along with this, there is the effect that the parasitic inductance of the multilayer capacitor itself can be made smaller and the ESL can be reduced.

Due to this, according to the multilayer capacitor of the first aspect of the present invention, the ESL can be greatly reduced. Therefore, this multilayer capacitor can be suitably used as a decoupling capacitor for a power source of a CPU and for example the oscillation of the power source voltage can be suppressed.

In the first aspect of the present invention, preferably the first internal conductor is formed with a first linkage lead part for connecting with the first linkage electrode separate from a first terminal lead part for connecting with the first terminal electrode, the second internal conductor is formed with a second linkage lead part for connecting with the second linkage electrode separate from a second terminal lead part for connecting with the second terminal electrode, the first polarity conductor is formed with a third linkage lead part for connecting with the first linkage electrode, and the second polarity conductor is formed with a fourth linkage lead part for connecting with the second linkage electrode. By forming these lead parts, the electrical connections between the internal conductors and the terminal electrodes or linkage electrodes become more reliable.

In the first aspect of the present invention, alternatively the second polarity conductor is arranged between the first internal conductor and the first polarity conductor through the electric sheets, and the first polarity conductor is arranged between the second polarity conductor and the second internal conductor. By arranging the elements in this way, it become easy to create portions where the directions of currents between conductors adjoining each other in the stacking direction become opposite.

In the first aspect of the present invention, preferably a plurality of the first and second internal conductors and the first and second polarity conductors are ford in the stacking direction through the dielectric sheets. By stacking a plurality of such conductors, not only is the electrostatic capacity of the capacitor increased, but also the action of canceling out the magnetic fields in further enhanced, the parasitic inductance of the multilayer capacitor itself can be further reduced, and the ESL can be further reduced.

To achieve the first object of the invention, in accordance with a second aspect of the present invention, there is provided a multilayer capacitor having at least two of a first internal conductor and second internal conductor formed in flat shapes, a plurality of first polarity conductors formed in flat shapes, a plurality of second polarity conductors formed in flat shapes, a dielectric body formed by stacking a plurality of dielectric sheets with dielectric sheets sandwiching each of the conductors, a first terminal electrode arranged at an outside of the dielectric body so as to enable connection to an external circuit and connected to the first internal conductor, a second terminal electrode arranged at the outside of the dielectric body so as to enable connection to the external circuit and connected to the second internal conductor, a first linkage electrode for connecting the first internal conductor and one of the first polarity conductors at the outside of the dielectric body while creating portions where the directions of currents between the conductors adjoining each other along a stacking direction become opposite to each other, a second linkage electrode for connecting the second internal conductor and one of the second polarity conductors at the outside of the dielectric body while creating portions where the directions of currents between the conductors adjoining each other along the stacking direction become opposite to each other, a first intermediate linkage electrode for connecting the first polarity conductors at the outside of the dielectric body while creating portions where the directions of currents between the conductors adjoining each other along the stacking direction become opposite to each other, and a second intermediate linkage electrode for connecting the second polarity conductors at the outside of the dielectric body while creating portions where the directions of currents between the conductors adjoining each other along the stacking direction become opposite to each other.

In the multilayer capacitor of the second aspect of the present invention as well, actions and effects similar to those of the multilayer capacitor according to the first aspect of the present invention can be expected. Further, in the second aspect of the present invention, it is possible to increase the number of the first and second polarity electrodes connected to the first and second internal conductors. Further, it is possible to increase the number of the linkage electrodes. Further, it is possible to make the directions of currents flowing through adjoining linkage electrodes opposite to each other. As a result, the action of canceling out the magnetic fields is further enhanced, the parasitic inductance of the multilayer capacitor itself can be further reduced, and the ESL can be further reduced.

In the second aspect of the present invention, preferably the first internal conductor, the second internal conductor, the first polarity conductors, and the second polarity conductors are formed with lead parts for connection with any of the first terminal electrode, second terminal electrode, first linkage electrode, second linkage electrode, first intermediate linkage electrode, and/or second intermediate linkage electrode.

By forming these lead parts, connection between the conductors end electrodes becomes easier and it becomes easier to create portions where the directions of currents between conductors adjoining each other along the stacking direction become opposite to each other.

In the second aspect of the present invention, preferably at least one of the first internal conductor and second internal conductor is comprised of at least two split conductors insulated from each other on the same flat surface, and these split conductors are connected to a wide first linkage electrode wide or second linkage electrode.

By using such a broad first linkage electrode or second linkage electrode, it is possible to form at least one of the first internal conductor and second internal conductor by at least two split conductors insulated from each other on the same flat surface. In this case as well, it becomes easier to create portions where the directions of currents between conductors adjoining each other along the stacking direction become opposite to each other.

To achieve the second objects according to a third aspect of the present invention, there is provided a multilayer capacitor comprising a dielectric body formed by stacking dielectric layers, at least one pair of a first terminal electrode and second terminal electrode arranged at an outside of the dielectric body and able to be connected to an external circuit, a first internal conductor arranged in a flat shape inside the dielectric body and connected to the first terminal electrode, a second internal conductor arranged in a flat shape inside the dielectric body so as not to be connected to the first internal conductor and connected to the second terminal electrode, at least one first polarity conductor arranged inside the dielectric body while being separated from the first internal conductor and the second internal conductor by the dielectric layers, and a first linkage electrode arranged at the outside of the dielectric body and connecting the first internal conductor and the first polarity conductor.

In the multilayer capacitor of the third aspect of the present invention, the first internal conductor is connected to the first polarity conductor through the first linkage electrode. These conductors function as the same polarity. Therefore, as the path through which the current flows inside the multilayer capacitor becomes longer, the ESR of the multilayer capacitor increases.

Therefore, this multilayer capacitor can be used even for applications of flattening the output of the switching power source instead of an electrolytic capacitor and therefore the number of layers can be increased and the capacity can be made much larger. That is, this multilayer capacitor is increased in the ESR, so can suppress oscillation of voltage of the power source and can be used for various applications such as a switching power source.

In the third aspect of the present invention, preferably the capacitor further has, separate from the first polarity conductor, a second polarity conductor arranged inside the dielectric body while being separated from the first internal conductor and the second internal conductor by the dielectric layers, and a second linkage electrode connecting the second internal conductor and the second polarity conductor is formed at the outside of the dielectric body.

In this case, a conductor of the same polarity is connected to not only the first internal conductor, but also the second internal conductor. Therefore, as the path through which the current flows inside the multilayer capacitor becomes longer, the ESR of the multilayer capacitor increases.

In the third aspect of the present invention, preferably the first internal conductor is formed with a first terminal lead part for connection with the first terminal electrode and is formed with a first linkage lead part for connection with the first linkage electrode. By formation of the lead parts, the connections between the first internal conductor and the terminal electrode and linkage electrode become more reliable.

In the third aspect of the prevent invention, preferably the second internal conductor in formed with a second terminal lead part for connection with the second terminal electrode and is formed with a second linkage lead part for connection with the second linkage electrode. By formation of the lead parts, the connections between the second internal conductor and the terminal electrode and linkage electrode become more reliable.

In the third aspect of the present invention, preferably the first polarity conductor is formed with a third linkage lead part for connection with the first linkage electrode. By formation of the lead part, the connection between the first polarity conductor and first linkage electrode becomes more reliable.

In the third aspect of the present invention, preferably the second polarity conductor is formed with a fourth linkage lead part for connection with the second linkage electrode. By formation of the lead part, the connection between the second polarity conductor and second linkage electrode becomes more reliable.

In the third aspect of the present invention, preferably a plurality of the first internal conductors and second internal conductors are formed inside the dielectric body. By increasing the number of layers of the first internal conductor and second internal conductor, the electrostatic capacity of the capacitor increases. Further, in the third aspect of the present invention, since the first polarity conductor is connected to at least the first internal conductor, it is possible to control the ESR to a desired value by suitably adjusting the number of layers of the first internal conductor and second internal conductor.

In the third aspect of the present invention, preferably a notch formed in the first internal conductor and/or second internal conductor. By forming a notch, the path of the current at that notch becomes longer, the conductor width becomes narrower, the resistance increases, and the effect of increase of the ESR in large.

In the third aspect of the present invention, preferably the first internal conductor and the first polarity conductor are connected by a plurality of the first linkage electrodes. By connecting the first internal conductor and first polarity conductor by a plurality of first linkage electrodes, the connections between the conductors become more reliable and it is possible to effectively prevent poor connections etc.

In the third aspect of the present invention, preferably a plurality of the first terminal electrodes and a plurality of the second terminal electrodes are provided at the outside of the dielectric body, the first internal conductor is formed with a plurality of first terminal lead parts for connection to the plurality of first terminal electrodes, and the second internal conductor is formed with a plurality of second terminal lead parts for connection to the plurality of second terminal electrodes.

In this case, since a plurality of terminal electrodes is provided, it is possible to realize a multilayer capacitor. Further, it is possible to realize the actions and effects of the third aspect of the present invention. Note that in the multilayer capacitor, the adjoining terminal electrodes become opposite in polarity.

In the third aspect of the present invention, preferably the width of at least part of the first internal conductor other than at the first terminal lead part is narrower than the width of the first terminal lead part. In this case as well, since the width of the conductor through which the current passes becomes narrower, the resistance increases and the ESL can be increased.

To achieve the first and second objects, according to a fourth aspect of the present invention, there is provided a multilayer capacitor comprising a dielectric body formed by stacking dielectric sheets, a pair of a first terminal electrode and second terminal electrode arranged at an outside of the dielectric body and insulated from each other, at least one first linkage electrode arranged at the outside of the dielectric body and insulated from the first terminal electrode and second terminal electrode, a first internal electrode stacked inside the dielectric body through the dielectric sheets and connected to the first terminal electrode, a second internal electrode stacked inside the dielectric body through the dielectric sheets and connected to the second terminal electrode, and a first polarity conductor stacked inside the dielectric body through the dielectric sheets, connected to the first linkage electrode so as to be connected to the first internal electrode.

In the multilayer capacitor of the fourth aspect of the present invention, it is possible to achieve the actions and effects of the multilayer capacitors of the first to third aspects of the present invention.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1:
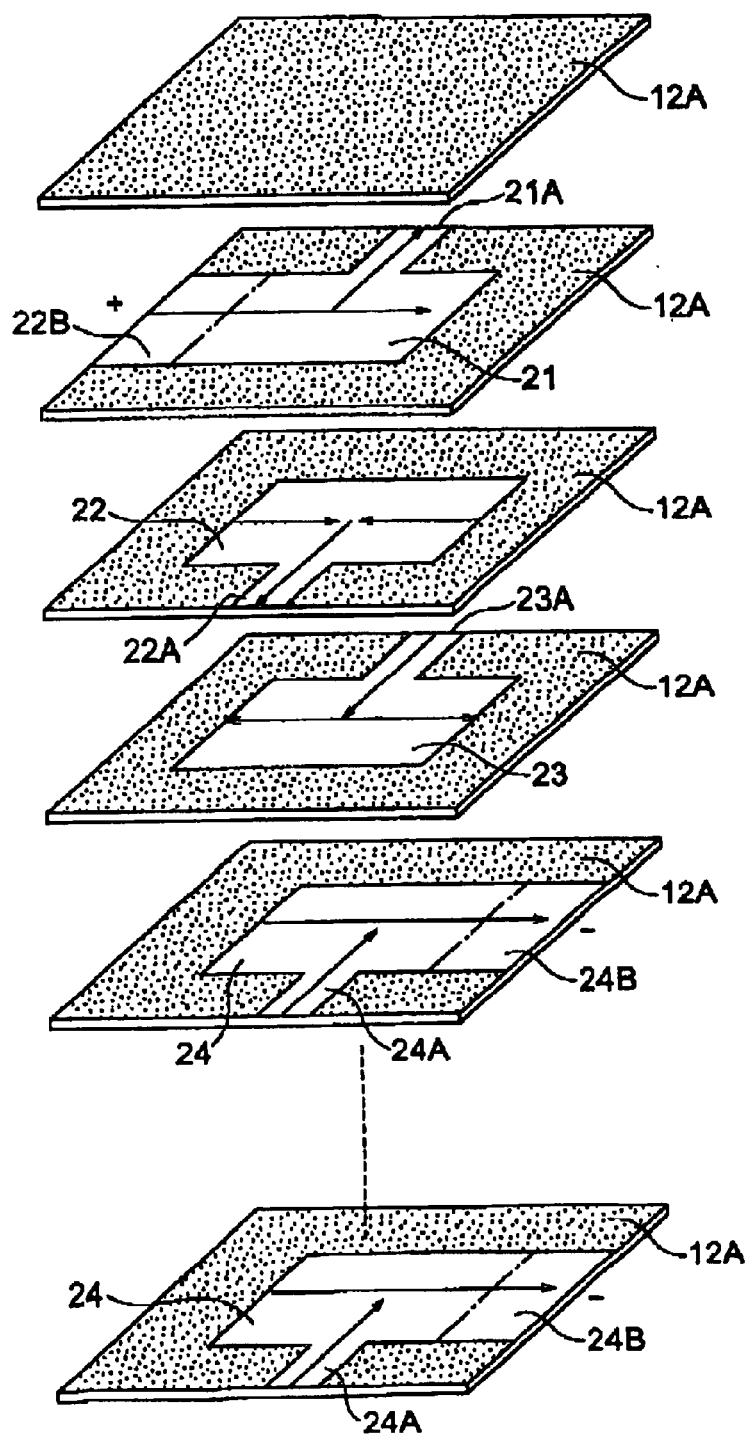
FIG. 1 in a disassembled perspective view of the inside of a multilayer capacitor according to a first embodiment of the present invention.
Figure 2:
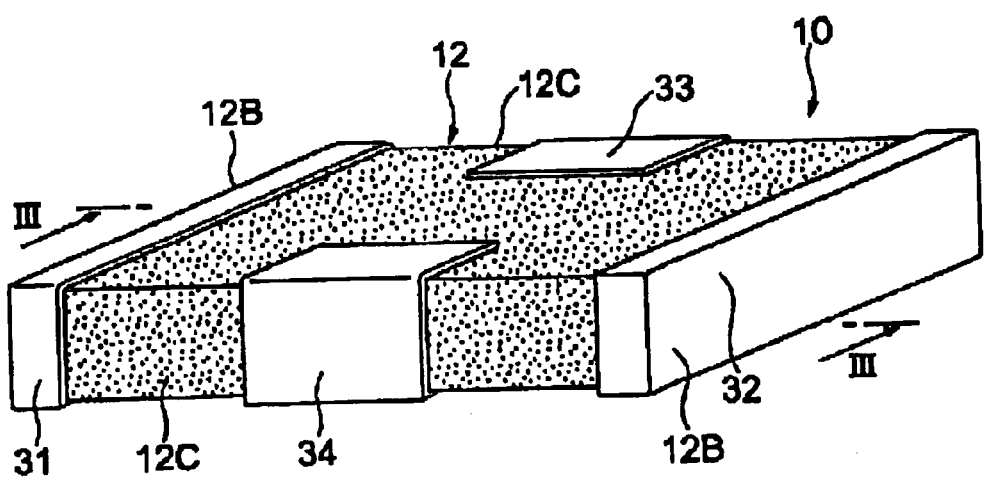
FIG. 2 is a schematic perspective view of the capacitor shown in FIG. 1.
Figure 3:
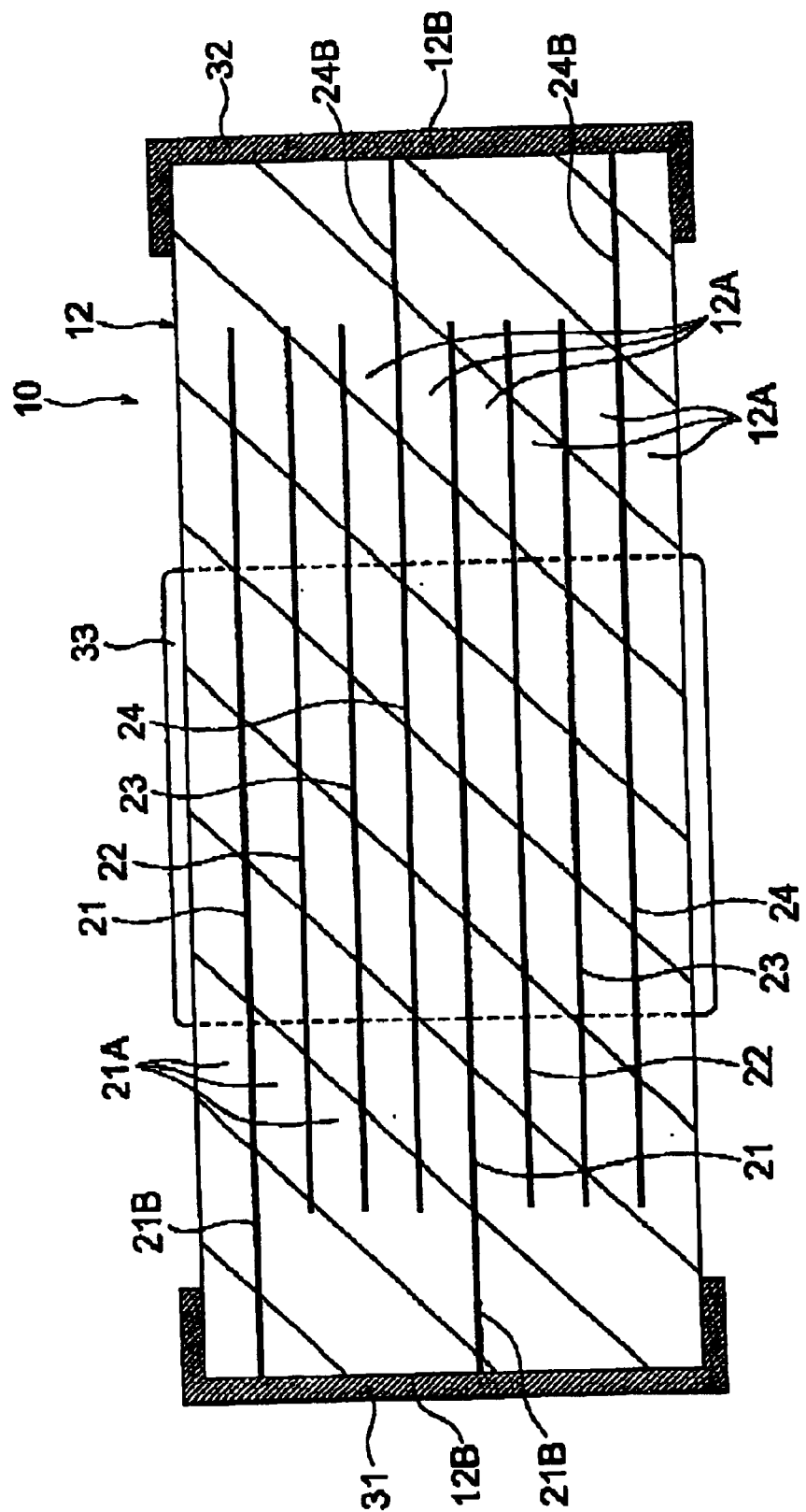
FIG. 3 is a sectional view along the line III—III.

The multilayer capacitor (multilayer ceramic capacitor) 10 according to the present embodiment shown in FIG. 1 to FIG. 3 has a dielectric body 12 comprised of a rectangular parallelopiped shaped sintered body obtained by sintering a stack of a plurality of ceramic green sheets comprising dielectric sheets. That is, the dielectric body 12 is formed by stacking dielectric sheets comprised of sintered ceramic green sheets.

A flat shaped internal electrode (first internal conductor) 21 in arranged at a predetermined height position along the stacking direction inside the dielectric body 12. A similar flat shaped internal electrode (second polarity conductor) 22 in arranged inside the dielectric body 12 below the internal electrode 21 insulated by a ceramic layer 12A of the dielectric sheet.

Similarly, a similar flat shaped internal electrode (first polarity conductor) 23 is arranged inside the dielectric body 12 below the internal conductor 22 insulated by a ceramic layer 12A. A similar flat shaped internal electrode (second internal conductor) 24 is arranged inside the dielectric body 12 below the internal electrode 23 insulated by a ceramic layer 12A.

After this, in the same way, a plurality of these internal electrodes 21, internal electrodes 22, internal electrodes 23, and internal electrodes 24 are successively arranged (only two sets shown in FIG. 3) insulated by ceramic layers 12A.

Therefore, the four types of the internal electrodes from the internal electrode 21 to the internal electrodes 24 are arranged inside the dielectric body 12 facing each other separated by the ceramic layers 12A. Further, the centers of the internal electrode 21 to the internal electrode 24 are arranged at substantially the same positions as the centers of the ceramic layers 12A. Further, the vertical and horizontal dimensions of the internal electrode 21 to the internal electrode 24 are made smaller than the lengths of the sides of the corresponding ceramic layers 12A.

On the other hand, as shown in FIG. 1, the conductor is led out from the left part of the internal electrode 21 toward the end of the left side of the ceramic layer 12A by the same width dimension as the width dimension of the internal electrode 21, whereby the internal electrode 21 is formed with one lead part (first terminal lead part) 21B. Separate from this, the conductor projects out from the rear part of the internal electrode 21 toward the end of the rear side of the ceramic layer 12A at one location, whereby the internal conductor 21 is formed with a projecting part (first linkage lead part) 21A.

Further, the conductor is led out from the front part of the internal electrode 22 toward the end of the front side of the ceramic layer 12A at one location, whereby the internal electrode 22 is formed with a projecting part (fourth linkage lead part) 22A. Further, the conductor projects out from the rear part of the internal electrode 23 toward the end of the rear side of the ceramic layer 12A at one location in a positional relationship overlapping the projecting part 21A when projected in the stacking direction of the ceramic layers 12A, whereby the internal electrode 23 is formed with a projecting part (third linkage lead part) 23A.

On the other hand, the conductor is led out from the right part of the internal electrode 24 toward the end of the left side of the ceramic layer 12A by the same width dimension an the width dimension of the internal electrode 24, whereby the internal electrode 24 is formed with one projecting part (second terminal lead part) 24B. Separate from this, the conductor projects out from the front part of the internal electrode 24 toward the end of the front side of the ceramic layer 12A at one location in a positional relationship overlapping the projecting part 22A when projected in the stacking direction of the ceramic layers 12A, whereby the internal electrode 21 is formed with a projecting part (second linkage lead party) 24A.

As explained above, the multilayer capacitor 10 according to the present embodiment has the projecting parts 21A and 23A of the internal electrodes 21 and 23 projecting out to the rear side of the dielectric body 12. Further, the projecting parts 22A and 24A of the internal electrodes 22 and 24 project out to the front side of the dielectric body 12. The widths of these projecting parts are formed narrower than the width of the internal electrode.

As shown in FIG. 2 and FIG. 3, the terminal electrode (first terminal electrode) 31 connected to the lead part 21B of the internal electrode 21 is arranged at the side surface 12B of the dielectric body 12. The terminal electrode (second terminal electrode) 32 connected to the lead part 24B of the internal electrode 24 is arranged at the side surface 12B at the right side of the dielectric body 12.

On the other hand, the first linkage electrode to be connected to the projecting part 21A of the internal conductor 21 and the projecting part 23A of the internal conductor 23, that is, the linkage electrode 33, is arranged at the side surface 12C at the rear side forming the outside of the dielectric body 22. Further, the second linkage electrode to be connected to the projecting part 22A of the internal conductor 22 and the projecting part 24A of the internal conductor 24, that is, the linkage electrode 34, is arranged at the side surface 12C at the front side forming the outside of the dielectric body 12. These linkage electrodes 33, 34, however, are meant only for connecting the internal electrodes 21 to 24 outside of the dielectric body 212, so are not connected to an external circuit.

In the present embodiment, the internal electrodes 21 to 24 are successively arranged inside the dielectric body 12 in a manner sandwiched between ceramic layers 12A comprised of the sintered dielectric sheets. The internal electrode 21 and internal electrode 24 having the lead parts 21B and 24B and to be connected to the terminal electrodes 31 and 32 are made two internal electrodes. Further, the internal electrode 22 to be connected to the internal electrode 21 through the linkage electrode 33 is made two types of same polarity conductors. As a result, the internal electrodes 21 to 24 become facing electrodes of the capacitor.

From these results, the multilayer capacitor 10 according to the present embodiment is a dielectric body 12 comprised of a rectangular parallelopiped, that in, a six-sided body, having terminal electrodes 31, 32 arranged at two side surfaces 123 among the four side surfaces 12B and 12C, that is, a two-terminal structure multilayer capacitor. The terminal electrode 31 among these terminal electrodes 31, 32 is for example electrically connected to the electrode side of the CPU, while the terminal electrode 32 is for example connected to the ground side. That is, these terminal electrodes 31, 32 are connected to an external circuit.

Therefore, when every other internal electrode 21, 23 connected to each other by the linkage electrode 33 for example becomes a + polarity and, at the same time, every other internal electrode 22, 24 connected to each other by the linkage electrode 34 becomes a − polarity, the result is as follows: That is, these internal electrodes 21 to 24 are arranged so that there are portions where the currents flow in opposite directions between internal electrodes adjoining each other vertically through the ceramic layers 12A as shown by the directions of currents shown by the arrow marks in FIG. 1.

As the material of the internal electrodes 21 to 24, not only may base metal materials such as nickel, nickel alloy, copper, or copper alloy be considered, but also materials mainly comprised of these metals may be considered.

Next, the action of the multilayer capacitor 10 according to the present embodiment will be explained. According to the multilayer capacitor 10 according to the present embodiment, a dielectric body 12 is formed by stacking a plurality of ceramic layers 12A with the ceramic layers 12A sandwiched between internal electrodes 21, 22, 23, 24 formed in flat shapes. Each of the two terminal electrodes 31, 32 arranged at the outside of the dielectric body 12 is connected to one of the two internal electrodes 21, 24.

Further, these internal conductors, that is, the internal electrodes 21 and 24, and the same polarity conductors, that is, the internal electrodes 23 and 22, are formed with projecting parts 21A, 24A, 23A, and 22A projecting out at the ends of the ceramic layers 12A.

Further, as shown in FIG. 1, the linkage electrode 33 connects the projecting part 21A of the internal electrode 21 and the projecting part 23A of the internal electrode 23 at the outside of the dielectric body 12 while creating portions where the directions of currents become opposite between conductors adjoining each other along the stacking direction. Further, the linkage electrode 34 connects the projecting part 24A of the internal electrode 24 and the projecting part 22A of the internal electrode 22 at the outside of the dielectric body 12.

That is, in the present embodiment, the linkage electrode 33 connects the internal electrode 21 and the internal electrode 23, while the linkage electrode 34 connects the internal electrode 24 and the internal electrode 22. At this time, there are locations where currents flow in opposite directions between the internal electrodes adjoining each other in the stacking direction among the internal electrodes 21 to 24.

Specifically, as shown by the arrow marks in FIG. 1, when current flows from the left side to the right side at the internal electrode 21, current flowing from the left and right to the center at the internal electrode 22 adjoining the internal electrode 21 at the bottom is caused and currents therefore flow in opposite directions at the right parts of the internal electrodes 21 and 22.

Further, at the internal electrode 23 adjoining the internal electrode 22 at its bottom, a flow of current spreading from the center to the left and right is caused and therefore currents flow in opposite directions between the internal electrodes 22 and 23. Further, at the internal electrode 24 adjoining the internal electrode 23 at its bottom, a flow of current is created from the left side to the right side and therefore currents flow in opposite directions at the left parts of the internal electrodes 23 and 24.

Therefore, the action of cancellation of the magnetic fields occurs at the locations where the currents flow in opposite directions. Along with this, there are the effects that the parasitic inductance of the multilayer capacitor 10 itself can be reduced and the ESL can be reduced.

Figure 10:
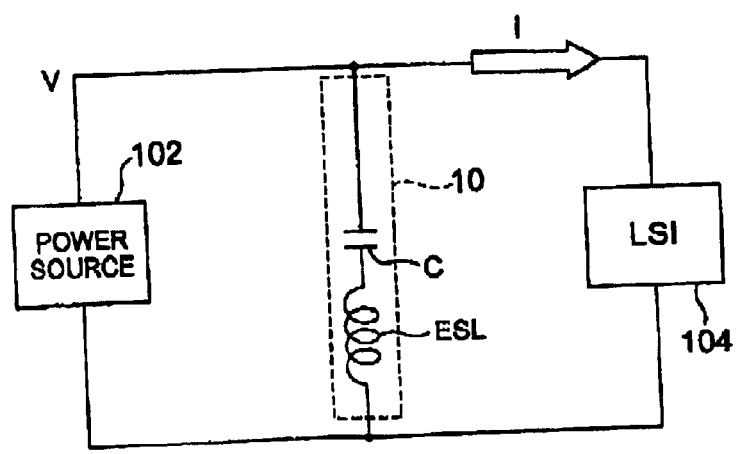
FIG. 10 is a circuit diagram showing an application of a decoupling capacitor.

Therefore, the capacitor 10 of the present embodiment, as shown in FIG. 10, is suitably used as for example a decoupling capacitor and can be connected in parallel to the power source 102 and LSI. This decoupling capacitor supplies current to the LSI 104, an integrated circuit of the CPU etc., by quick charging and discharging from the capacitor 10 at the time of transient fluctuation of the quickly changeable load current. Therefore, it is possible to suppress fluctuation in the power source voltage and stabilize the power source.

That is, according to the multilayer capacitor 10 according to the present embodiment, the ESL can be greatly reduced, the oscillation of the power source voltage can be suppressed, and use an a capacitor for the power source of a CPU such as a decoupling capacitor becomes possible.

Further, in the present embodiment, the internal electrodes 21, 22, 23, and 24 are formed with projecting parts 21A, 22A, 23A, and 24A and are connected to the two linkage electrodes 33, 34 through these projecting parts 21A, 22A, 23A, and 24A. Therefore, these internal electrodes 21, 22, 23, and 24 become able to be reliably connected to the two linkage electrodes 33, 34. Therefore, the above actions and effects can be achieved more reliably.

Still further, in the present embodiment, the internal electrode 21 and internal electrode 23 have arranged at positions adjoining each other along the stacking direction an internal electrode 24 and internal electrode 22 forming different polarities from the same. Conversely, the internal electrode 24 and internal electrode 22 have arranged at positions adjoining each other along the stacking direction an internal electrode 21 and internal electrode 23 forming different polarities from the same.

That in, by any of the internal electrode 21 and internal electrode 23 and any of the internal electrode 24 and internal electrode 22 being for example alternately arranged along the stacking direction, the above actions and effects can be obtained while reliably maintaining the functions as the multilayer capacitor 10.

Second Embodiment

Next, a multilayer capacitor according to a second embodiment of the present invention will be explained based on FIG. 4 and FIG. 5. Members the same as members explained in the first embodiment are assigned the same reference numerals and overlapping explanations partially omitted.

In the first embodiment, the four types of internal conductors of the internal electrodes 21 to 24 were arranged inside the dielectric body 12 facing each other while being separated by ceramic layers 12A. As opposed to this, in the multilayer capacitor 40 according to the present embodiment, there are eight types of internal electrodes 41 to 48 of substantially the same shapes at substantially the same positions at the ceramic layers 12A in the first embodiment.

Figure 4:
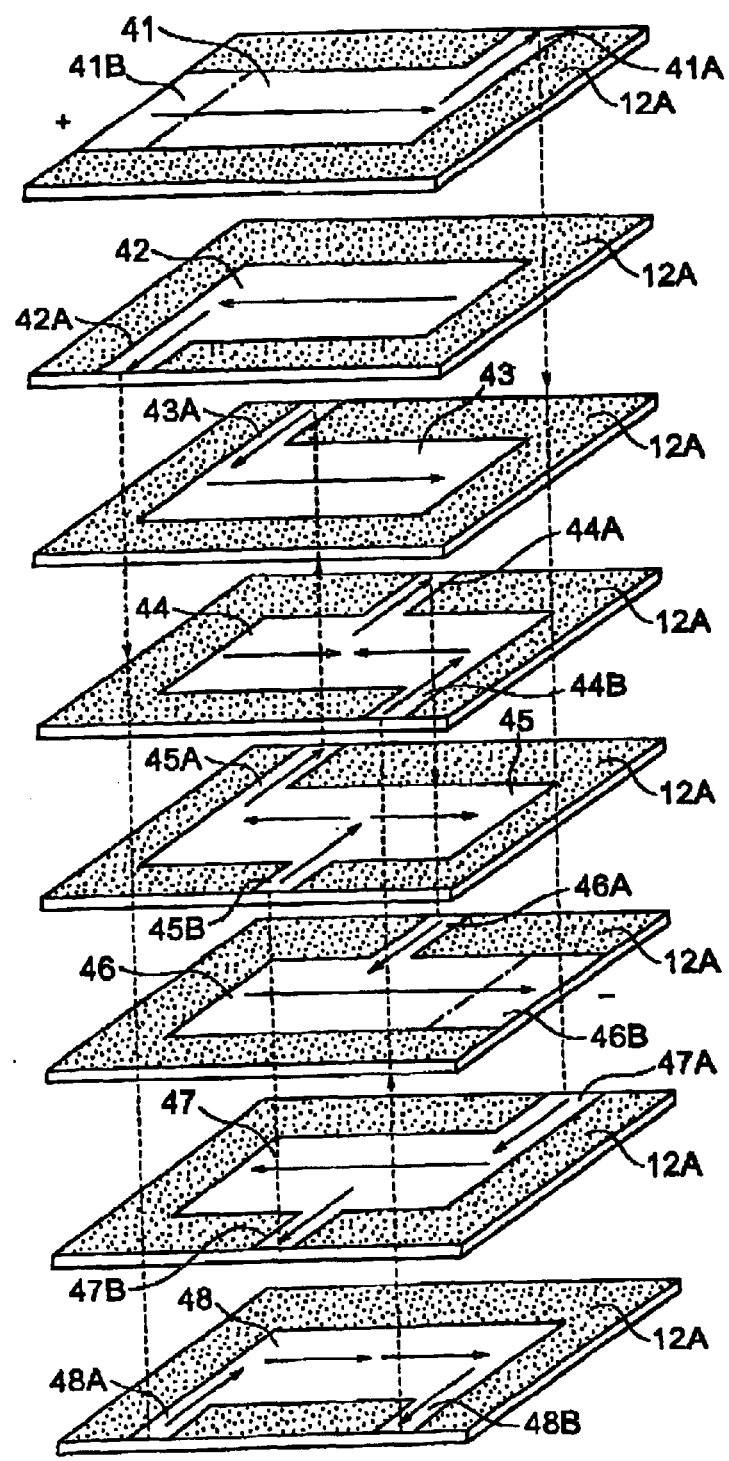
FIG. 4 is a disassembled perspective view of the inside of a multilayer capacitor according to another embodiment of the present invention.
Figure 5:
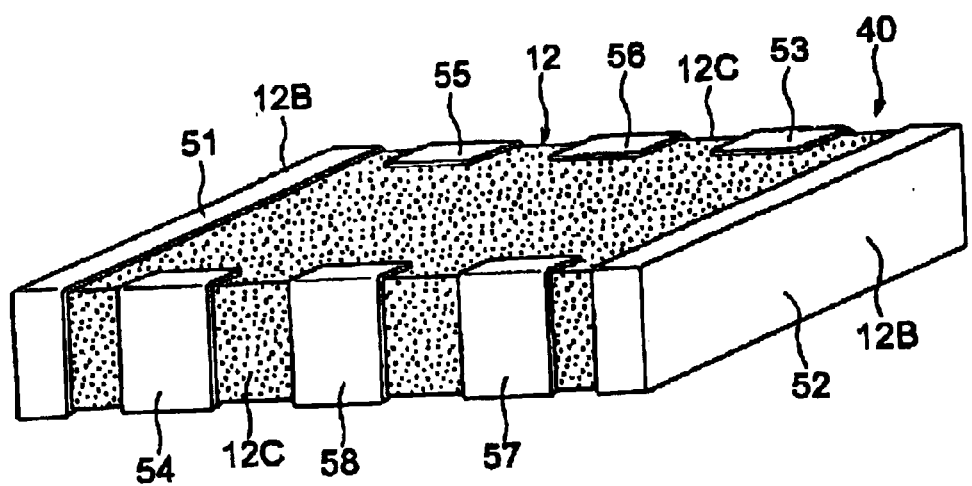
FIG. 5 is a schematic perspective view of the capacitor shown in FIG. 6.

That in, as shown in FIG. 4 and FIG. 5, a flat shaped internal conductor (first internal conductor) 41 is arranged at a predetermined height position along the stacking direction inside the dielectric body 12. A similar flat shaped internal conductor (second polarity conductor) 42 is arranged inside the dielectric body 12 below the internal electrode 41 separated by a ceramic layer 12A made of the dielectric sheet. Similarly, a similar flat shaped internal conductor (first polarity conductor) 43 is arranged inside the dielectric body 12 below the internal conductor 42 separated by a ceramic layer 12A.

After this, in the same way, a plurality of these internal conductors 44 (second polarity conductors), internal conductors (first polarity conductors) 45, internal conductors (second internal conductors) 46, internal conductors (first polarity conductors) 47, and internal conductors (second polarity conductors) 48 are successively arranged. A plurality of these eight types of the internal conductors 41 to 48 are repeatedly successively arranged in the same sequence.

As shown in FIG. 4, the conductor is led out from the left part of the internal conductor 41 toward the end of the left side of the ceramic layer 12A by the same width dimension as the width dimension of the internal electrode 41, whereby the internal electrode 41 is formed with one lead part 41B. Further, the conductor is led out from the right part of the internal electrode 46 toward the end of the right side of the ceramic layer 12A by a width dimension the same as the width dimension of the internal electrode 46, whereby the internal electrode 46 is formed with a single lead part 46B.

Further, the terminal electrode (first terminal electrode) 51 to be connected to the lead part 41B of the internal electrode 41 is, as shown in FIG. 5, arranged at the side surface 12B of the left side of the dielectric body 12. The terminal electrode (second terminal electrode) 52 to be connected to the lead part 46B of the internal electrode 46 is, as shown in FIG. 5, arranged at the side surface 12B of the right aide of the dielectric body 12.

Separate from this, the conductors project out from the right ends of the rear sides of the internal electrode 41 and internal electrode 47 toward the end of the rear side of the ceramic layer 12A, so that the internal electrode 41 is formed with a projecting part (lead part)41A and the internal electrode 47 is formed with a projecting part (lead part) 47A. A linkage electrode (first linkage electrode) 53 to be connected to the projecting part 41A of the internal electrode 41 and the projecting part 47A of the internal electrode 47 is arranged at the side surface of the rear side forming the outside of the dielectric body 12.

Further, the conductor projects out from the left ends of the front sides of the internal electrode 42 and internal electrode 48 each toward the end of the front side of the ceramic layer 12A at one location, whereby the internal electrode 42 is formed with a projecting part (lead part) 42A and the internal electrode 48 is formed with a projecting part (lead part) 48A. A linkage electrode (second intermediate linkage electrode) 54 to be connected to the projecting part 42A of the internal electrode 42 and the projecting part 48A of the internal electrode 48 is arranged at the side surface 12C of the front side forming the outside of the dielectric body 12.

Further, the conductor projects out from the left ends of the rear sides of the internal electrode 43 and internal electrode 45 toward the end of the rear side of the ceramic layer 12A at one location each, whereby the internal electrode 43 is formed with a projecting part (lead part) 43A and the internal electrode 45 is formed with a projecting part (lead part) 45A. A linkage electrode (first intermediate linkage electrode) 55 to be connected to the projecting part 43A of the internal electrode 43 and the projecting part 45A of the internal electrode 45 is arranged at the side surface 12C of the rear side forming the outside of the dielectric body 12.

Further, the conductor projects out from the middles of the rear sides of the internal electrode 44 and internal electrode 46 toward the end of the rear side of the ceramic layer 12A at one location each, whereby the internal electrode 44 in formed with a projecting part (lead part) 44A and the internal electrode 46 is formed with a projecting part (lead part) 46A. The side surface 12C of the rear side forming the outside of the dielectric body 12 is formed with a projecting part 44A of the internal electrode 44 and a projecting part 46A of the internal electrode 46. A linkage electrode (second linkage electrode) 56 to be connected to the projecting part 44A of the internal electrode 44 and the projecting part 46A of the internal electrode 46 is arranged at the side surface 12C of the rear side forming the outside of the dielectric body 12.

Further, the conductor projects out from the right ends of the front sides of the internal electrode 44 and internal electrode 48 toward the end of the front side of the ceramic layer 12A at one location each, whereby the internal electrode 44 is formed with a projecting part 44B and the internal electrode 48 is formed with a projecting part 48B. A linkage electrode (second intermediate linkage electrode) 57 to be connected to the projecting part 44B of the internal electrode 44 and the projecting part 48B of the internal electrode 48 is arranged at the side surface 12C of the front side forming the outside of the dielectric body 12.

Further, the conductor projects out from the middles of the front sides of the internal electrode 45 and internal electrode 47 toward the end of the front side of the ceramic layer 12A at one location each, whereby the internal electrode 45 is formed with a projecting part 45B and the internal electrode 47 in formed with a projecting part 47B. A linkage electrode (first intermediate linkage electrode) 58 to be connected to the projecting part 45B of the internal electrode 43 and the projecting part 47B of the internal electrode 47 is arranged at the side surface 12C of the front side forming the outside of the dielectric body 12.

Due to the above, when current flows between the terminal electrode 51 to be connected to the electrode side of a CPU for example and the terminal electrode 52 to be connected to the ground side, every other internal electrode 41, 47, 45, and 43 connected to each other by the linkage electrodes 53, 58, and 55 for example becomes a + polarity. At the same time, every other internal electrode 46, 44, 49, and 42 connected to each other by the linkage electrodes 56, 57, and 54 for example becomes a − polarity. At this time, in the same way as in the first embodiment, currents flow as in the directions shown by the arrow marks in FIG. 4, and there are portions where the currents flow in opposite directions between internal electrodes adjoining each other vertically through the ceramic layers 12A.

That is, in the multilayer capacitor 40 according to present embodiment as well, in the name way as in the first embodiment, the internal electrode 41 and internal electrode 46 to be connected to the terminal electrodes 51, 52 through the lead parts 41B, 46B are made two internal conductors.

The three internal electrodes 47, 45, and 43 to be connected to the internal electrode 41 through the linkage electrodes 53, 58, and 55 become first polarity electrodes, while the three internal electrodes 44, 49, and 42 to be connected to the internal electrode 46 through the linkage electrodes 56, 57, and 54 become second polarity electrodes. As a result, the internal electrodes 41 to 48 became facing electrodes of the capacitor.

That is, in the multilayer capacitor 40 according to the present embodiment as well, in the same way as in the first embodiment, there are the effects that a great reduction in the ESL is achieved and oscillation of the power source voltage is suppressed. On top of this, in the present embodiment, two types of the same polarity conductors comprised of the plurality of, that is, three, internal electrodes 47, 45, and 43 and the same plurality of, that is, three, internal electrodes 44, 48, and 42, are successively arranged in the dielectric body 12. Further, linkage electrodes 53, 58, and 55 and linkage electrodes 56, 57, and 54 connect these.

Therefore, not only does the electrostatic capacity of the multilayer capacitor 40 according to the present embodiment become higher, but also the action of cancellation of the magnetic fields becomes greater, the inductance is more greatly reduced, and the ESL is reduced more.

Third Embodiment

Next, a multilayer capacitor according to a third embodiment of the present invention will be explained based on FIG. 6 and FIG. 7. Members the same as members explained in the first embodiment and second embodiment are assigned the same reference numerals and overlapping explanations partially omitted.

In the multilayer capacitor 60 according to the present embodiment, in the same way an in the first embodiment, four types of internal conductors are arranged inside of the dielectric body 12 facing each other while separated by ceramic layers 12A. Further, of the four types of internal conductors, the ones from the top to the third position are structured the same as the internal electrodes 41, 42, and 43 of the second embodiment. Further, the terminal electrodes 51, 52 are formed in the same way as in the second embodiment.

Figure 6:
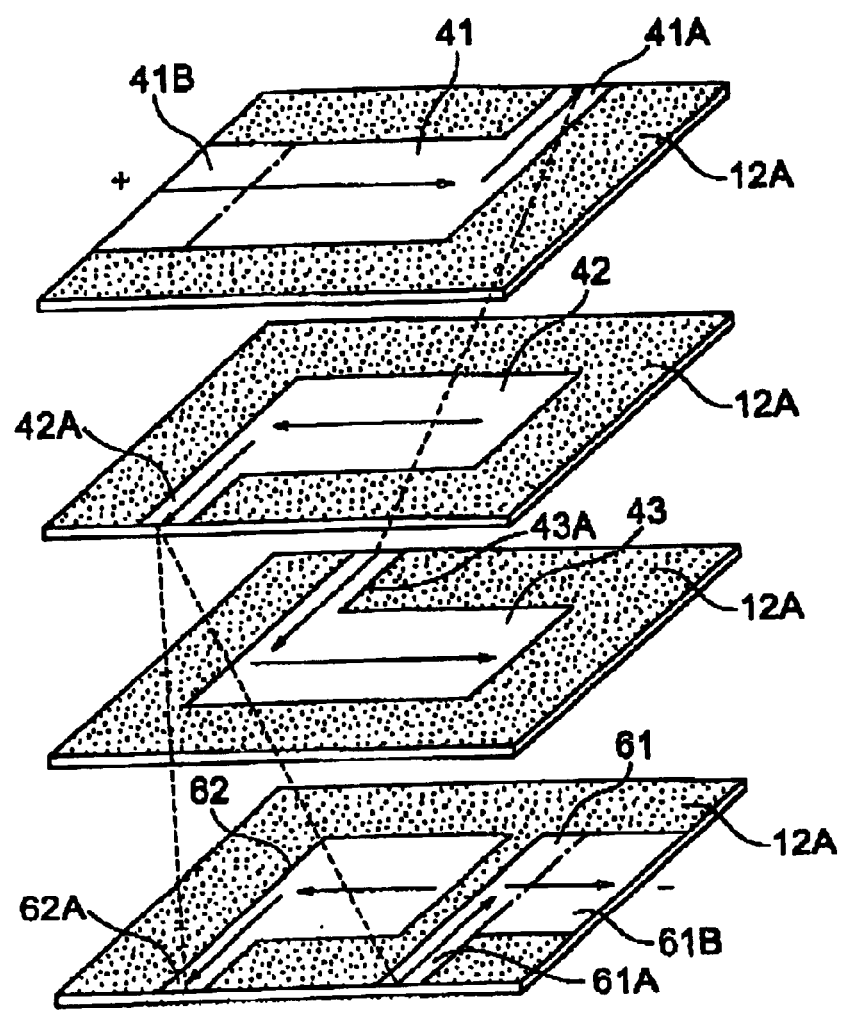
FIG. 6 is a disassembled perspective view of the inside of a multilayer capacitor according to still another embodiment of the present invention.

As shown in FIG. 6, however, the fourth internal electrode in comprised of internal electrodes (split electrodes) 61 and 62 insulated by being separated by a slit extending from the front side to the rear side. Further, the conductor is led out from part of the right side of the internal electrode 61 toward the end of the right side of the ceramic layer 12A by the same width dimension as the width dimension of the internal electrode 61, whereby the internal electrode 61 is formed with a single lead part 61B leading to the terminal electrode 52.

Separate from this, the conductor projects out from the left ends of the internal electrode 61 and internal electrode 62 toward the end of the front side of the ceramic layer 12A at one location each, whereby the internal electrode 61 is formed with a projecting part (lead part) 61A and the internal electrode 62 is formed with a projecting part (lead part) 62A.

Figure 7:
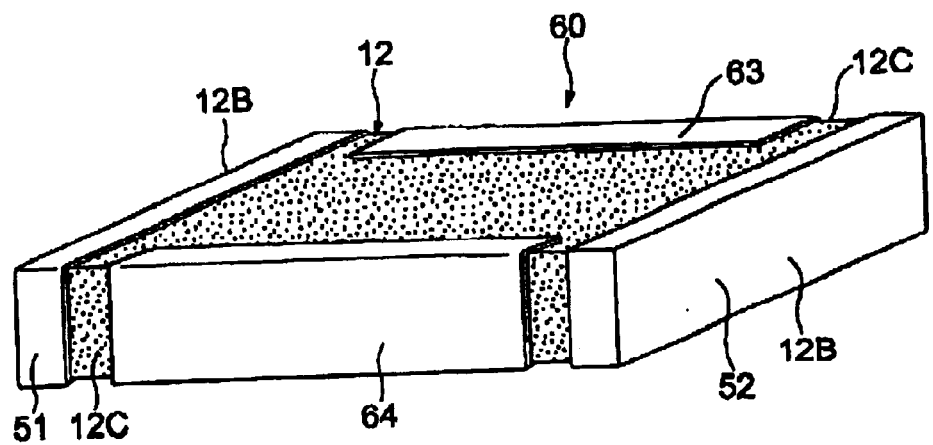
FIG. 7 is a schematic perspective view of the capacitor shown in FIG. 6.

As shown in FIG. 7, a broad width linkage electrode 63 to be connected to the projecting part 41A of the internal electrode 41 and the projecting part 43A of the internal electrode 43 is arranged at the side surface 12C of the rear side forming the outside of the dielectric body 12. Further, a broad width linkage electrode 64 to be connected to not only the projecting part 61A of the internal electrode 61 and the projecting part 62A of the internal electrode 62, but also the projecting part 42A of the internal electrode 42 is arranged at the side surface 12C of the front side forming the outside of the dielectric body 12.

In the multilayer capacitor according to the present embodiment as well, in the same way as in the first embodiment and second embodiment, the internal electrode 41 and internal electrode 61 to be connected to the terminal electrodes 51, 52 through the lead parts 413, 613 are made two internal conductors. Further, in the present embodiment, the projecting part 41A of the internal electrode 41 and the projecting part 43A of the internal electrode 43 are arranged in a positional relationship not overlapping with each other when projected in the stacking direction of the ceramic layers 12A. Since the linkage electrode 63 in formed broad, however, they are connected without problem.

Further, the projecting part 42A of the internal electrode 42 and the projecting part 61A of the internal electrode 61 are arranged in a positional relationship not overlapping with each other when projected in the stacking direction of the ceramic layers 12A. Since the linkage electrode 64 in formed broad, however, they are connected without problem.

Further, in the present embodiment, the fourth internal electrode from the top is split by a slit. While the internal electrode 61 comprised of the internal conductor and the internal conductor 62 comprised of the same polarity conductor are arranged in the same plans, they are connected by the linkage electrode 64. Therefore, in the present embodiment, as shown in FIG. 6, the currents flow in opposite directions even between the internal electrode 43 and internal electrode 62 adjoining each other in the stacking direction.

In the multilayer capacitor 60 according to the present embodiment an well, in the same way as in the other embodiments, there are the effects that a great reduction in the ESL is achieved and oscillation of the power source voltage is suppressed.

Fourth Embodiment

Next, the results of an experiment conducted to compare the impedances between the multilayer capacitor according to the first embodiment and a capacitor of the related art using an impedance analyzer will be shown below.

Figure 12:
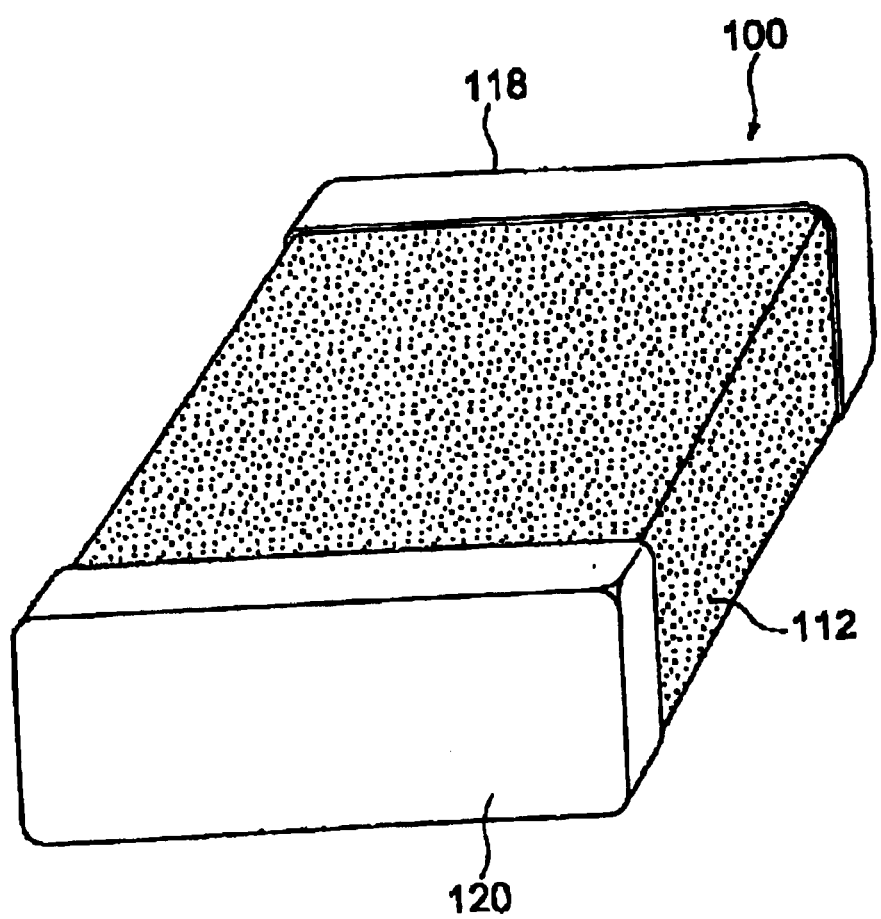
FIG. 12 is a schematic perspective view of a multilayer capacitor according to the related art.
Figure 13:
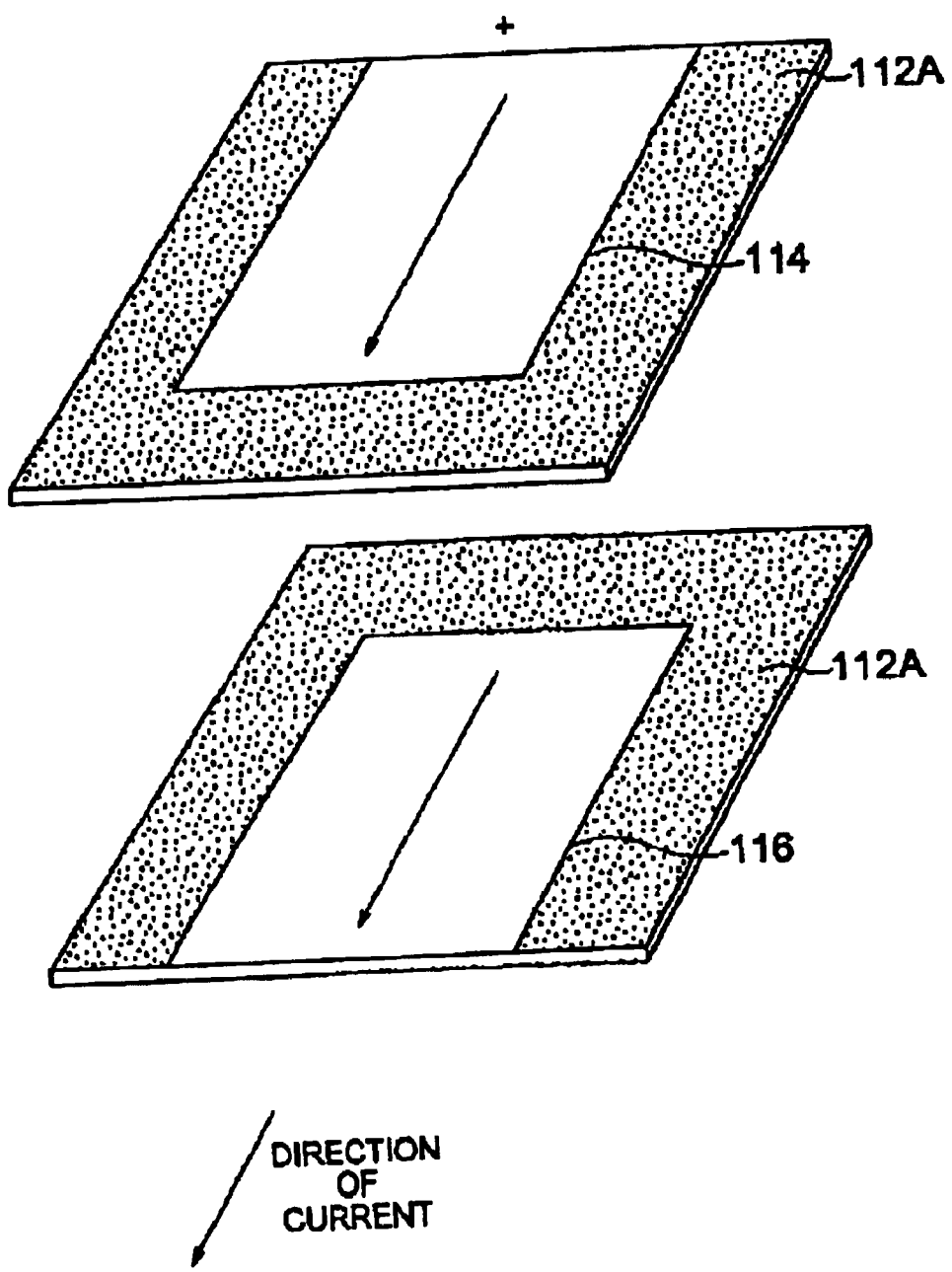
FIG. 13 is a disassembled perspective view of the inside of the capacitor shown in FIG. 12.

Further, as the capacitor of the related art compared with here, the multilayer ceramic capacitor 100 shown in FIG. 12 and FIG. 13 was used. In this multilayer ceramic capacitor 100 shown in FIG. 12, ceramic layers 112A provided with two types of internal conductors 114, 116 shown in FIG. 13 were alternately stacked to form a dielectric body 112. These internal conductors 114, 116 were formed by being led out to the two facing side surfaces of the dielectric body 112. The directions of the currents flowing through the internal conductors 114, 116 are made to be the same as each other as shown by the arrow marks.

Figure 8:
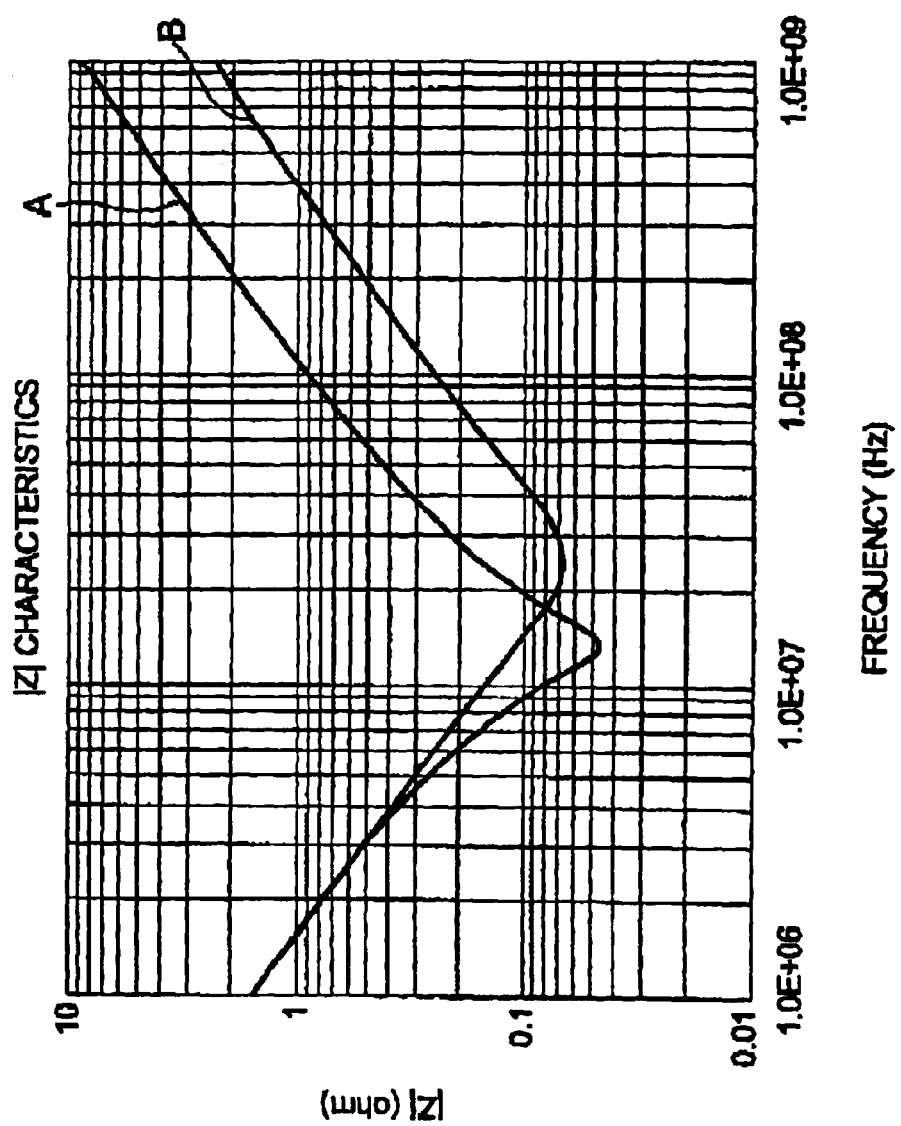
FIG. 8 is a graph of the frequency characteristics of a capacitor according to an embodiment of the present invention and a capacitor according to the related art.

The measurement results are shown in FIG. 8. As shown in FIG. 8, at the characteristic curve A showing the characteristic of a capacitor of the related art, near where the frequency exceeds 1.0E+07 Hz, that is, 10 MHz, there is a location where the impedance drops sharply and resonance occurs. As opposed to this, at the characteristic curve B showing the characteristic of a multilayer capacitor 10 according to an embodiment, there is no such a location and no resonance occurs.

Figure 11:
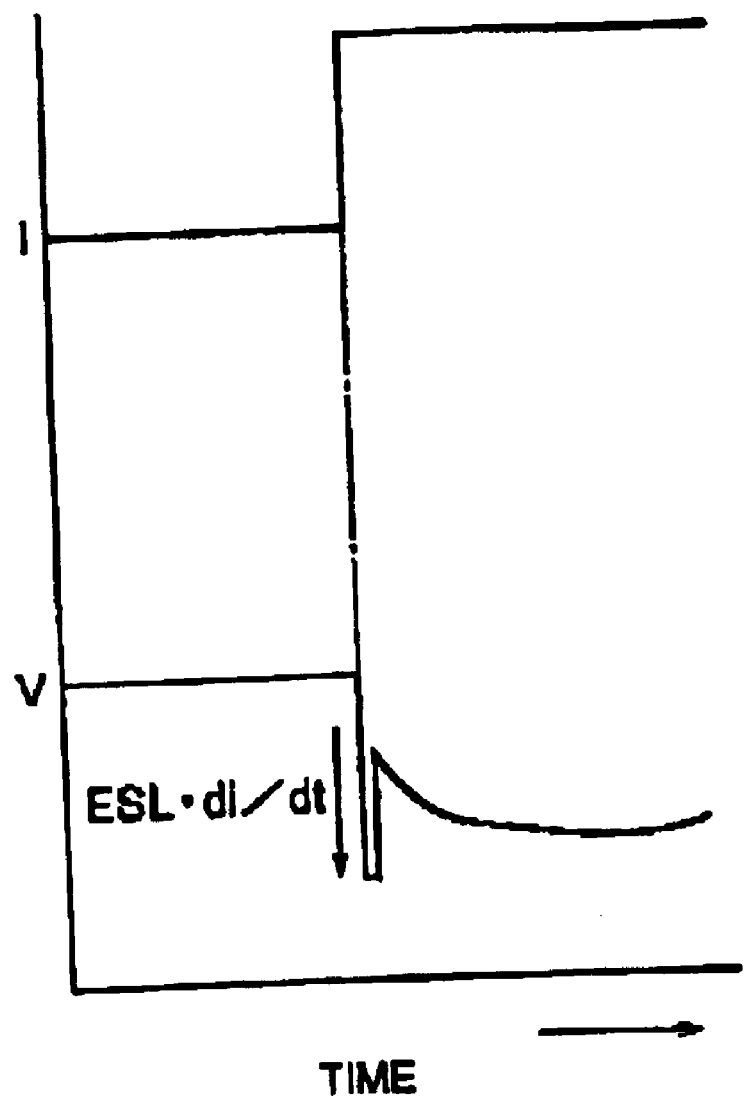
FIG. 11 is a graph of the fluctuations in the voltage with respect to fluctuations in the load current at a capacitor according to the related art.

Further, with the capacitor of the related art, the ESL was 1420 pH, while with the multilayer capacitor 10 according to the embodiment, the ESL was 382 pH. That is, it was confirmed that the ESL was greatly reduced compared with the capacitor of the related art by the multilayer capacitor 10 according to the embodiment. Note that if the ESL is large as with the capacitor of the related art, as shown in FIG. 11, the fluctuation in the power source voltage V becomes great at the time of charging/discharging accompanying fluctuations in the load current 1 and it becomes impossible to deal with the higher speed of changes of the power source voltage.

Figure 9:
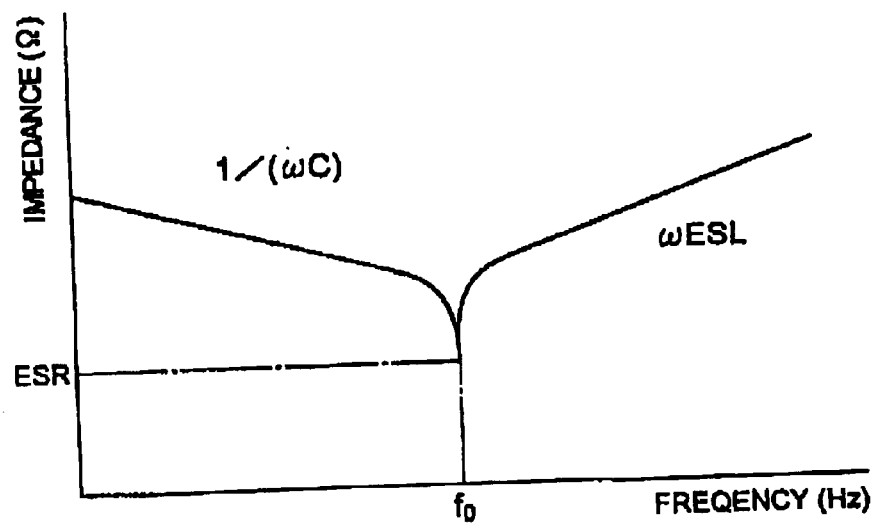
FIG. 9 is a graph of the relationship with the ESR at the self resonance frequency $f_0$.

Further, this ESL is found from the equation $2\Pi f_0 = 1/\sqrt{(ESL \cdot C)}$, where $f_0$ is the self resonance frequency and C is the electrostatic capacity. Further, the relationship with the ESR at the self resonance frequency $f_0$ is shown in FIG. 9. Further, the capacitors used for the test were of the 3216 Type having an electrostatic capacity of 0.105 $\mu$F in the case of the capacitor of the related art and 0.101 $\mu$F in the case of the multilayer capacitor 10 according to the present embodiment. Here, the "3216 Type" means a capacitor having a vertical dimension of 3.2 mm and a horizontal dimension of 1.6 mm.

Fifth Embodiment

A multilayer capacitor according to a fifth embodiment of the present invention will be explained based on FIG. 14 and FIG. 17. As shown in these figures, the multilayer capacitor 210 is mainly comprised of a rectangular parallelopiped shaped sintered body obtained by sintering a stack of a plurality of ceramic green sheets, that is, a dielectric body 212.

That is, the dielectric body 212 is formed by stacking dielectric layers comprised of sintered ceramic green sheets. A flat shaped first internal conductor, that is, an internal conductor 214, is arranged at a predetermined height position along the stacking direction inside the dielectric body 212. A similar flat shaped second internal conductor, that is, the internal conductor 216, is arranged inside the dielectric body 212 below the internal electrode 214 separated by a ceramic layer 212A made a dielectric layer.

Similarly, a similar flat shaped internal conductor (first polarity conductor) 218 is arranged inside the dielectric body 212 below the internal conductor 216 separated by a ceramic layer 212A. After this, in the same way, a plurality of these internal conductors 214, internal conductors 216, and internal conductors 218 are successively arranged separated by ceramic layers 212A.

The three type of the internal conductors from the internal conductor 214 to the internal conductor 218 are arranged inside the dielectric body 212 facing each other separated by the ceramic layers 212A. Further, the centers of the internal conductor 214 to the internal conductor 218 are arranged at substantially the same positions as the centers of the ceramic layers 212A. Further, the vertical and horizontal dimensions of the internal conductor 214 to the internal conductor 218 are made smaller than the lengths of the sides of the corresponding ceramic layers 212A.

Figure 14:
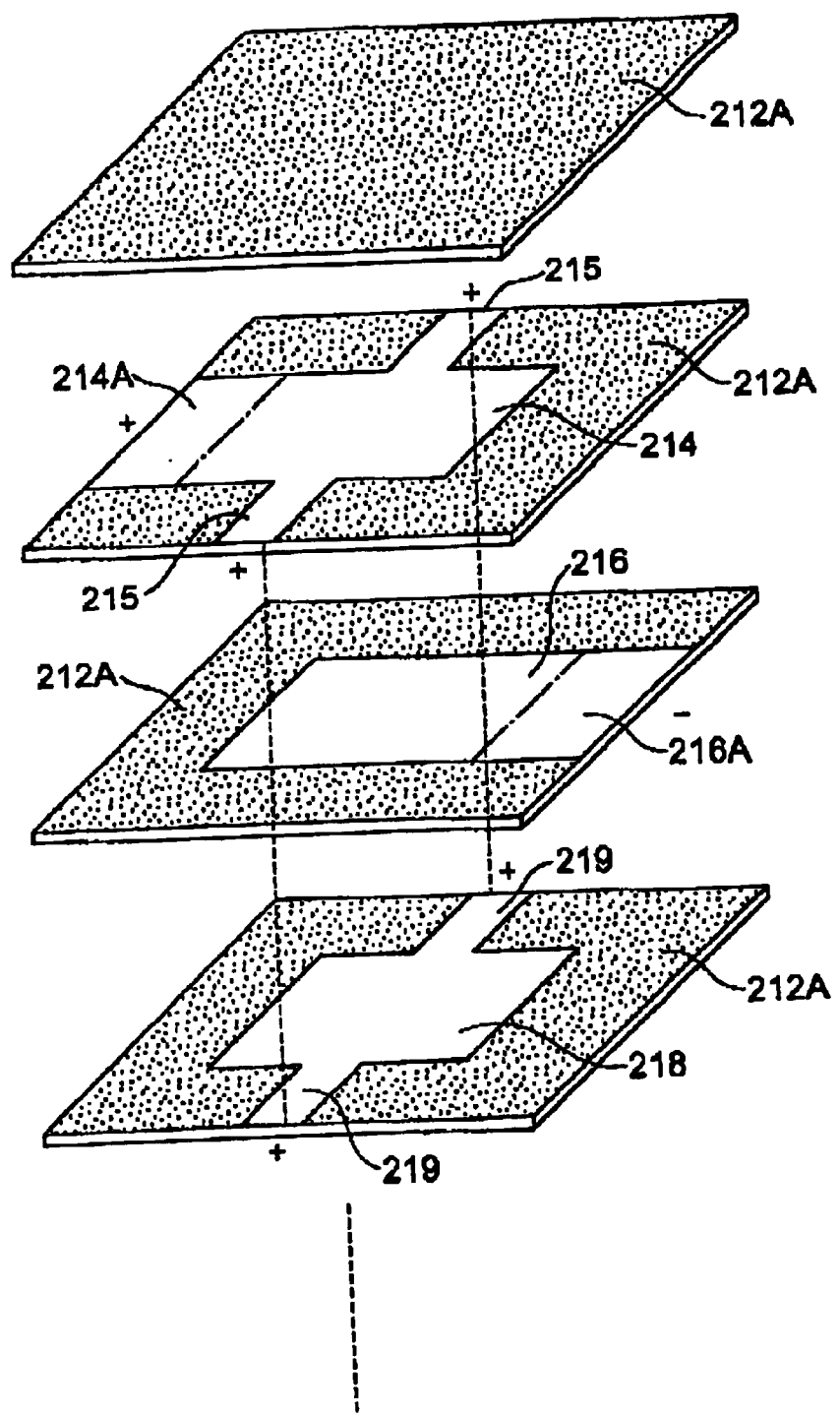
FIG. 14 is a disassembled perspective view of the inside of a multilayer capacitor according to still another embodiment of the present invention.

Further, as shown in FIG. 14, the conductor is made to project out from the left part of the internal conductor 214 toward the end of the left side of the ceramic layer 212A by the same width dimension as the width dimension of the internal conductor 214, whereby the internal conductor 214 is formed with a lead part (first terminal lead part) 214A. Separate from this, the conductor projects out from part of the front side and part of the rear side of the internal conductor 214 toward the end of the front side and the end of the rear side of the ceramic layer 212A at one location each, whereby the internal conductor 214 is also formed with two connection projecting parts (first linkage lead parts) 215.

Further, the conductor projects out from the right part of the internal conductor 216 toward the end of the right side of the ceramic layer 212A by the sane width dimension as the width dimension of the internal conductor 216, whereby the internal conductor 216 is formed with a lead part (second terminal lead part) 216A.

Further, the conductor projects out from part of the front side and part of the rear side of the internal conductor 218 toward the end of the front side and the end of the rear side of the ceramic layer 212A at one location each, whereby the internal conductor 218 in formed with two connection projecting parts (third linkage land parts) 219.

Figure 15:
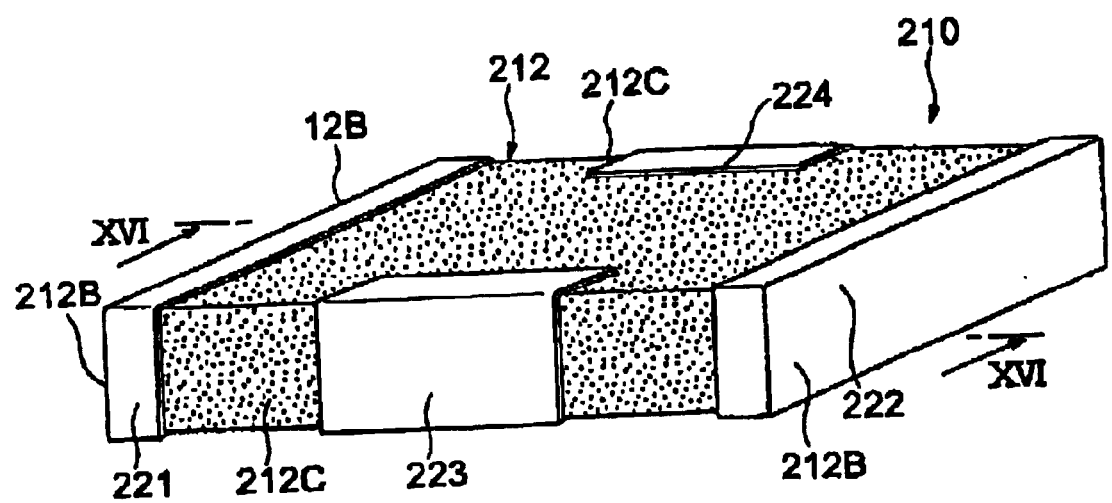
FIG. 15 is a schematic perspective view of the capacitor shown in FIG. 14.
Figure 16:
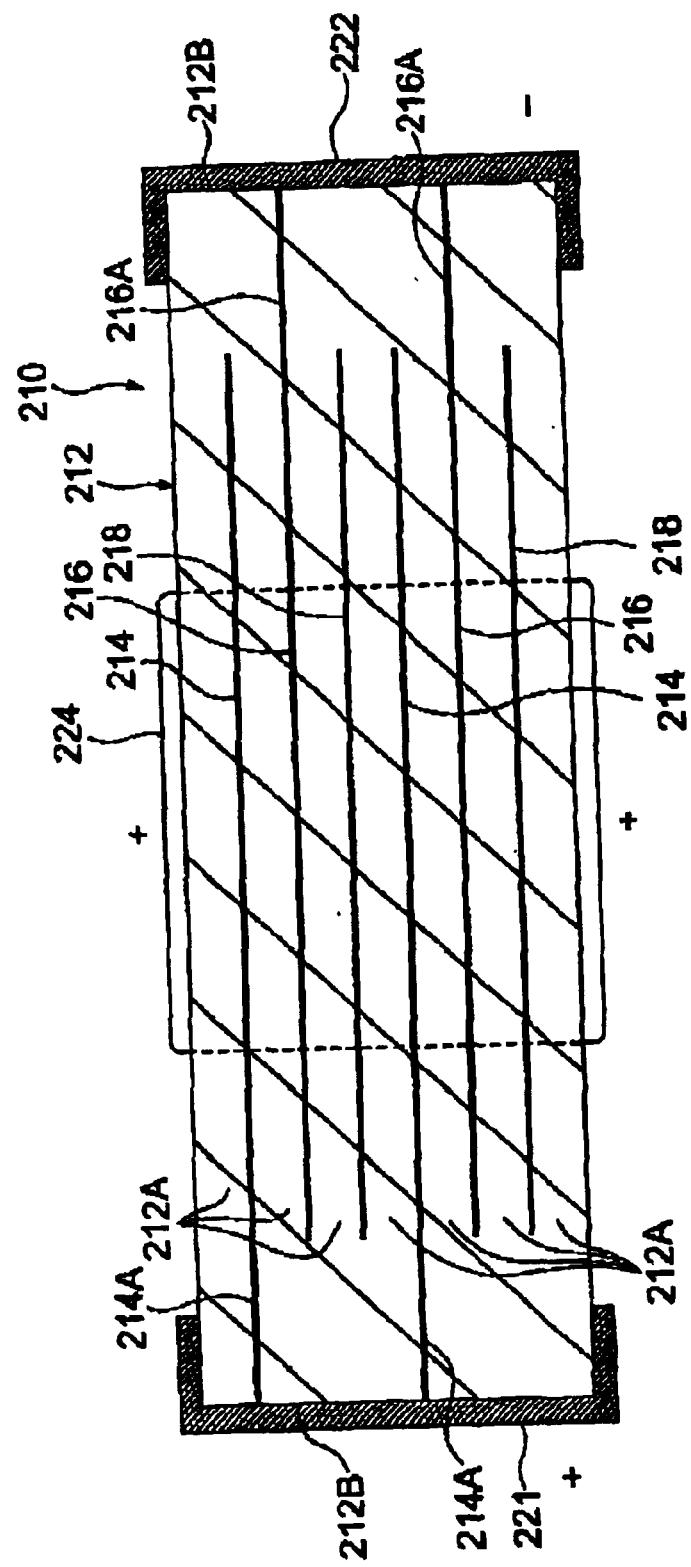
FIG. 16 is a sectional view of principal parts along the line XVI—XVI shown in FIG. 15.

Further, an shown in FIG. 15 and FIG. 16, the terminal electrode (first terminal electrode) 221 to be connected to the lead part 214A of the internal conductor 214 is arranged at the side surface 212B of the left side forming the outside of the dielectric body 212. Further, the terminal electrode (second terminal electrode) 222 to be connected to the projecting part 216A of the internal conductor 216 is arranged at the side surface 212B of the right side forming the outside of the dielectric body 212.

Further, the linkage electrodes 223, 224 shown in FIG. 15 connected to the two projecting parts 215 of the internal conductor 214 and the two projecting parts 219 of the internal conductor 218 are arranged at the side surface 212C at the front side and the Bide surface 212C of the rear side becoming the outsides of the dielectric body 212. That is, the two linkage electrodes 223, 224 connect the projecting parts 215 and projecting parts 219 at the outside of the dielectric body 212. These linkage electrodes 23, 24, however, are meant only for connecting the internal conductors outside of the dielectric body 212, so are not connected to an external circuit.

In the present embodiment, terminal electrodes 221, 222 and linkage electrodes 223, 224 ere arranged at the four side surfaces 212B, 212C of the dielectric body 212 comprised of a rectangular parallelopiped, that is, six-sided body, of the multilayer capacitor 210.

Further, the terminal electrode 221 among the terminal electrodes 221, 222 arranged at the left and right side surfaces 212B is for example connected to an electrode of the CPU, while the terminal electrode 222 is connected to for example the ground side so that the internal conductors 214 to 218 become electrodes of the capacitor.

A shown in FIG. 14 and FIG. 16, when for example the internal electrode 214 becomes a + polarity and the internal conductor 216 adjoining this internal conductor 214 becomes a − polarity, the internal conductor 218 connected with the internal conductor 214 through the linkage electrodes 223, 224 becomes a + polarity.

In the multilayer capacitor 210 according to the present embodiment, the internal conductor 214 connected to the terminal electrode 221 is connected up to the internal conductor 218 through the linkage electrodes 223, 224, so the internal conductor 218 functions as the same polarity as the internal conductor 214. Therefore, the path of flow of the current in the multilayer capacitor 210 becomes longer, and the ESR of the multilayer capacitor 210 increases.

Therefore, the capacitor 210 is suitably used for applications such as flattening the output of a switching power source instead of an electrolytic capacitor and is made much larger in capacity by increasing the number of layers. That is, the multilayer capacitor 210 according to the present embodiment increases in ESR, so can be applied for various applications including switching power sources.

Further, according to the present embodiment, pluralities of the projecting parts 215 and projecting parts 219 are provided, and pluralities, for example, two each, of the linkage electrodes 23, 24 for connecting these are arranged at the outside of the dielectric body 212. Therefore, the internal conductors 214 and internal conductors 218 are connected by the two linkage electrodes 223, 224. As a result, the contact locations are increased and these internal conductors are reliably connected, so poor contact etc. becomes harder to occur.

Further, according to the present embodiment, since a plurality of internal conductors 214 are stacked in the dielectric body 212, not only does the ESR became larger, but also it is possible to freely adjust the ESR to any magnitude by suitably setting the number of the internal conductors 214, so it is possible to control the ESR to the desired value.

Figure 17:
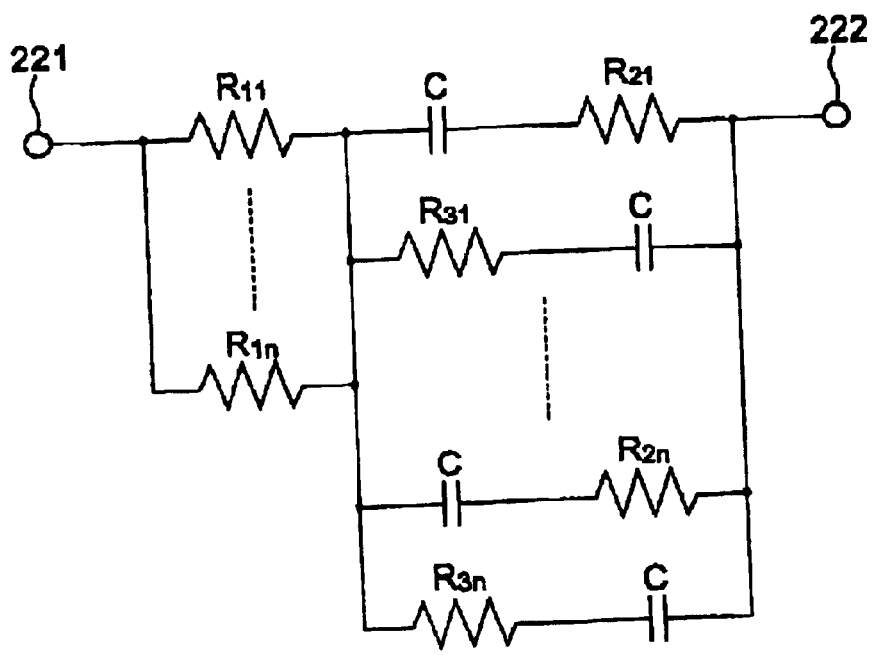
FIG. 17 is an equivalent circuit diagram of the capacitor shown in FIG. 14 to FIG. 16.

Specifically, the equivalent circuit of the multilayer capacitor 210 according to the present embodiment is as shown in FIG. 17. In this circuit diagram, C represents a capacitor, $R_{11}$ to $R_{1n}$ represent the equivalent resistances held by the plurality of internal conductors 214, $R_{21}$ to $R_{2n}$ represent the equivalent resistances held by the plurality of internal conductors 216, and n represents the numbers of the internal conductors 214, 216, and 218. Further, in FIG. 16, two each of the internal conductors are shown, but in fact larger numbers are stacked.

The fact that by adding any number of internal conductors 214 and reducing the other internal conductors 216, 218 by that amount, it is possible to adjust the ESR without changing the overall number of layers can be understood from this circuit diagram.

Figure 18:
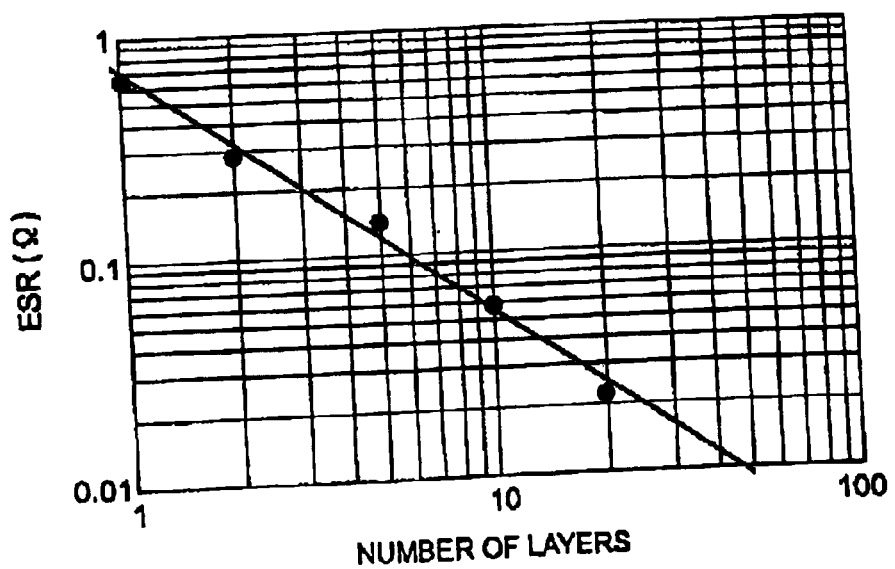
FIG. 18 is a graph of the relationship between the number of layers and the ESR in the capacitor shown in FIG. 14 to FIG. 16.

Further, the amount of change in the ESR due to the number of the internal conductors 214 stacked at this time is shown in FIG. 18. That is, the feat that the ESR changes in accordance with the number of internal conductors 214 stacked can be understood from this figure.

Sixth Embodiment

Next, a multilayer capacitor according to a sixth embodiment of the present invention will be explained based on FIG. 19. Members the same as members explained in the fifth embodiment are assigned the same reference numerals and overlapping explanations partially omitted.

Figure 19:
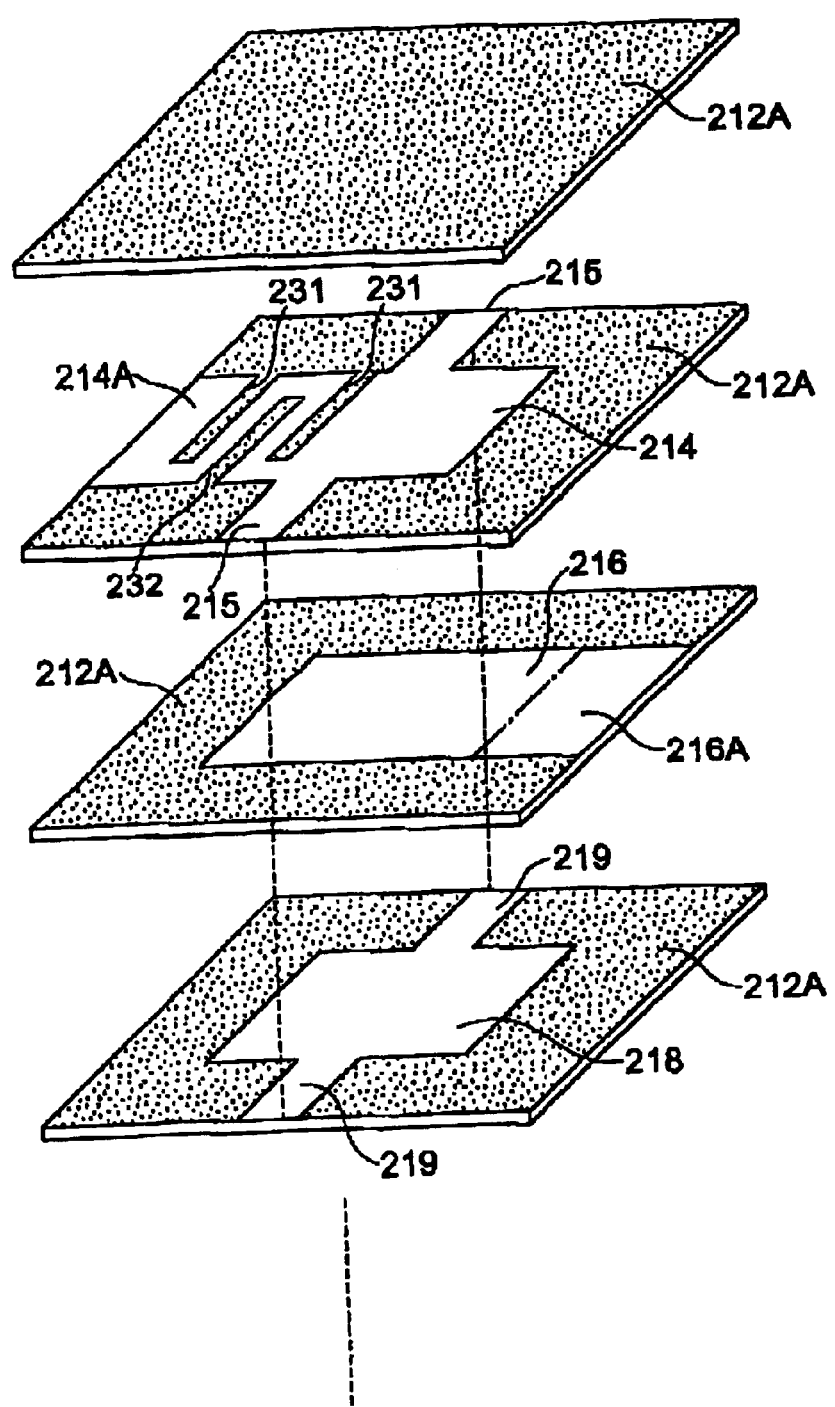
FIG. 19 is a disassembled perspective view of the inside of a multilayer capacitor according to still another embodiment of the present invention.

As shown in FIG. 19, in the present embodiment, a pair of notches 231 extending from the rear side to the inner side of the internal conductor 214 and a notch 232 formed between the pair of notches and extending from the front side to the inner side of the internal conductor 214 are provided cut into the internal conductor 214.

That is, by providing a plurality of notches 231, 232 at the internal conductor 214, the path of the current becomes narrower by bending in a zigzag manner and the effect of increasing the ESR increases more.

Seventh Embodiment

Next, a multilayer capacitor according to a seventh embodiment of the present invention will be explained based on FIG. 20. Members the same as members explained in the fifth embodiment are assigned the same reference numerals and overlapping explanations partially omitted.

Figure 20:
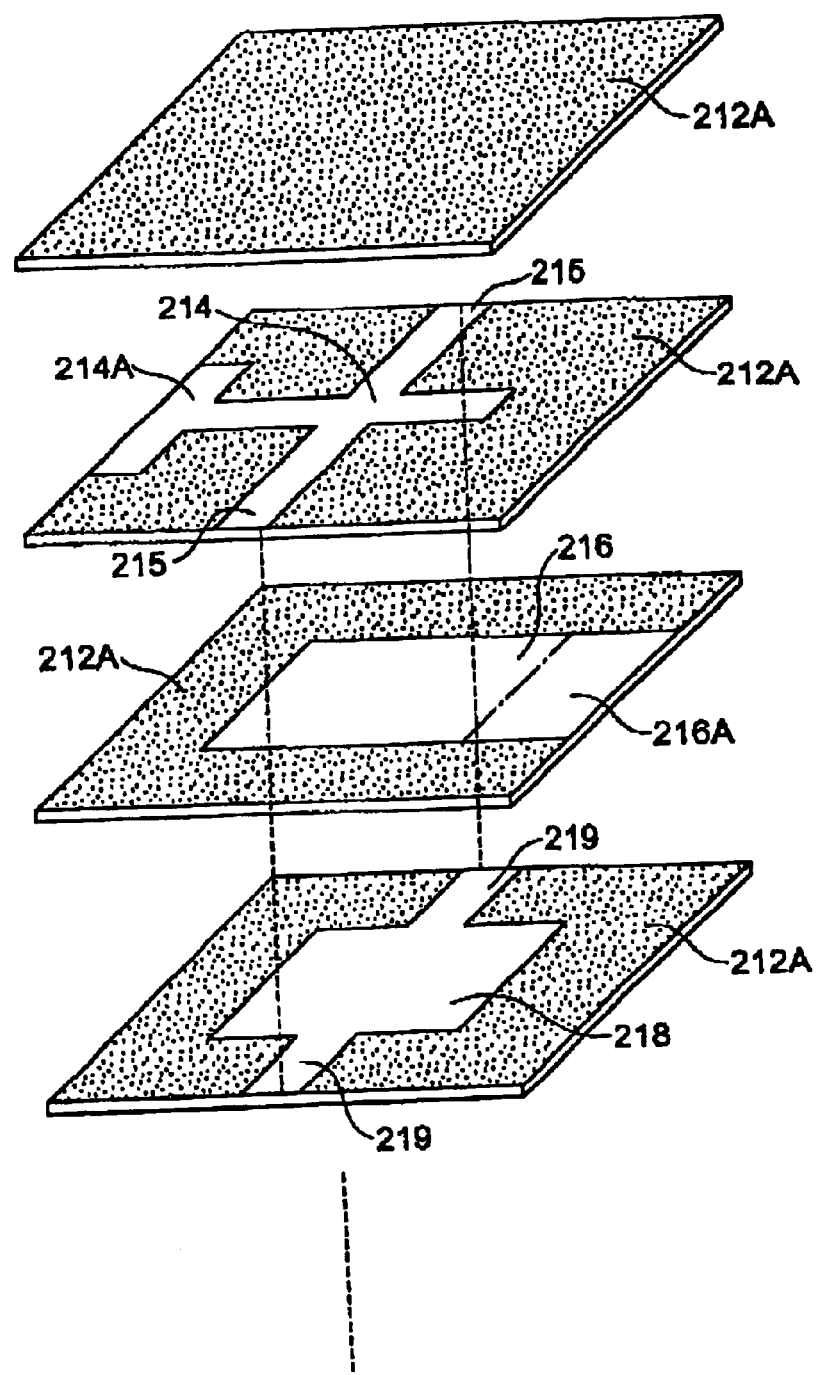
FIG. 20 is a disassembled perspective view of the inside of a multilayer capacitor according to still another embodiment of the present invention.

As shown in FIG. 20, in the present embodiment, the width dimension of the part of the internal conductor 214 except the lead part 214A is formed narrower than the width dimension of the lead part 214A.

That is, by maintaining the width dimension of the lead part 214A at a predetermined size, it is possible to secure reliable connection of the lead part 214A with the terminal electrode 221. Further, by forming the width dimension of the internal conductor 214 narrow, the electrical resistance of the Internal conductor 214 rises and the effect of increasing the ESR increases more.

Eighth Embodiment

Next, a multilayer capacitor according to an eighth embodiment of the present invention will be explained based on FIG. 21 and FIG. 22. Members the same as members explained in the fifth embodiment are assigned the same reference numerals and overlapping explanations partially omitted.

Figure 21:
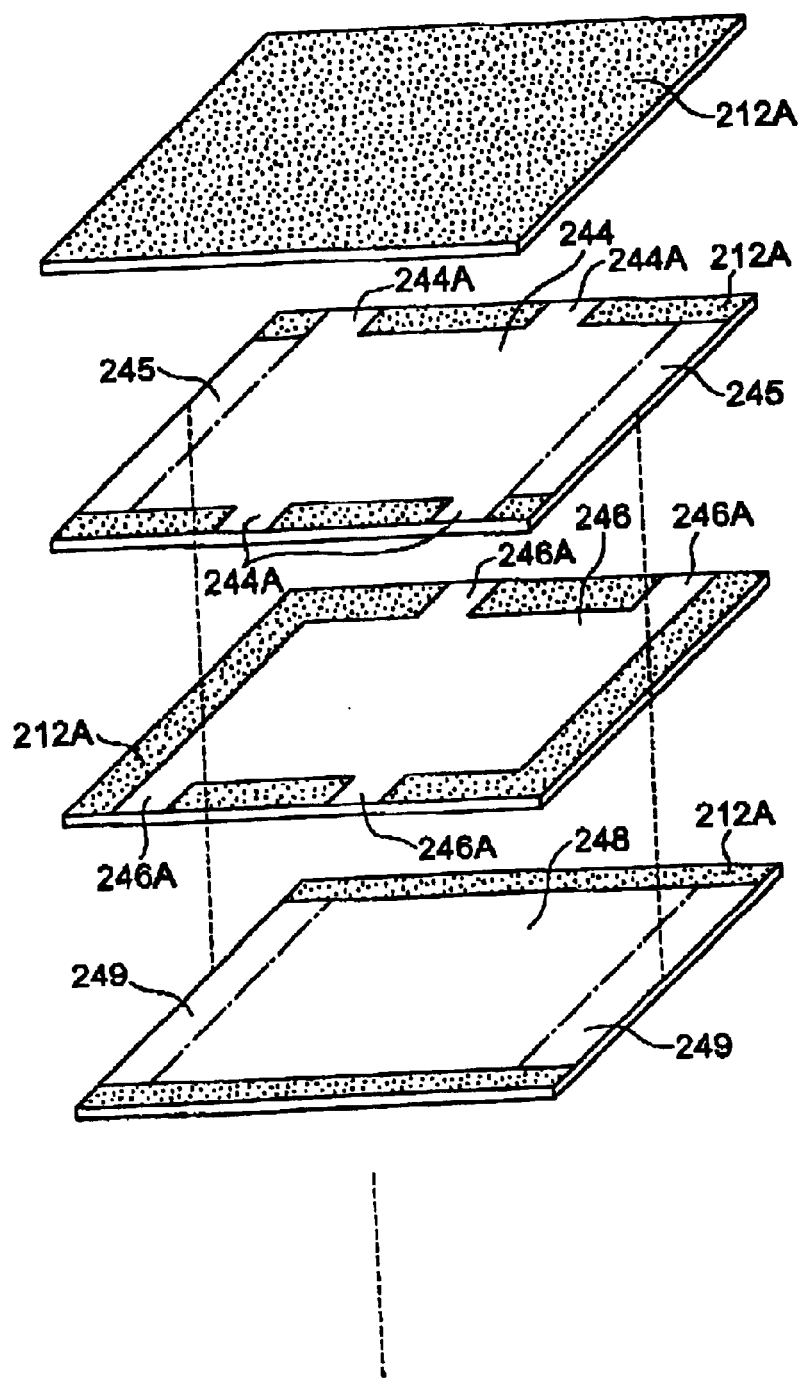
FIG. 21 is a disassembled perspective view of the inside of a multilayer capacitor according to still another embodiment of the present invention.
Figure 22:
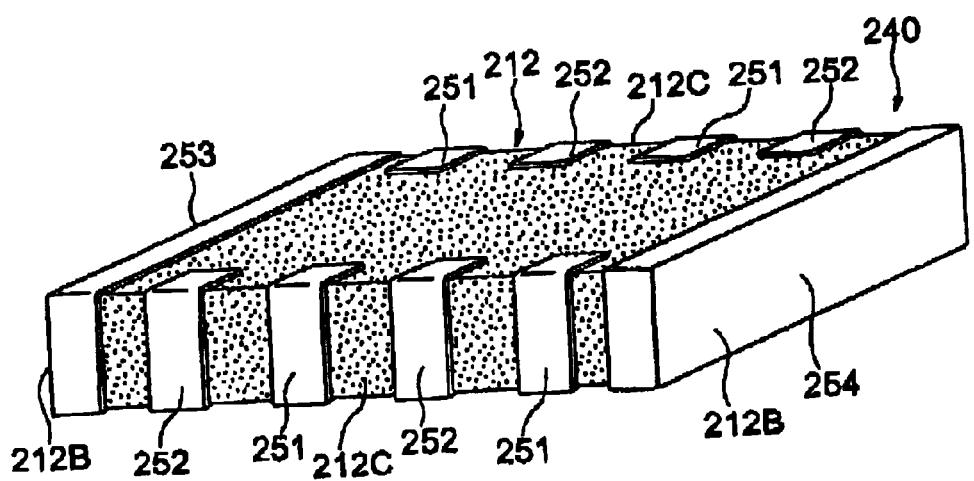
FIG. 22 is a schematic perspective view of the capacitor shown in FIG. 21.

As shown in FIG. 21 and FIG. 22, the first internal conductor of the multilayer capacitor 240 according to the present embodiment, that is, the internal conductor 244, has a total of four projecting parts (first terminal lead parts) 244A, two at each side, projecting out to the ends of the front side and rear side of the ceramic layer 212A. Further, the internal conductor 244 is formed, separate from the projecting parts 244A, with a pair of connection projecting parts (first linkage lead parts) 245 at the left and right ends of the ceramic layer 212A.

The internal conductor 246 comprised of the second internal conductor has a total of four terminal projecting parts (second terminal lead parts) 246A, two at each side, projecting out to the ends of the front side and tear side of the ceramic layer 212A. These terminal projecting parts 246A, however, are arranged shifted with respect to the terminal projecting parts 244A so as to be positioned without overlapping with the terminal projecting parts 244A.

Further, the internal conductor 248 comprising the first polarity electrode has connection projecting parts (third linkage lead parts) 249 projecting out to the left and right ends of the ceramic layer 212A. Further, as shown in FIG. 22, a pair of linkage electrodes (first linkage electrodes) 253, 254 arranged at the left and right ends forming the outside of the dielectric body 212 are connected with the connection projecting part 245 and connection projecting part 249 at the outside of dielectric body 212.

As shown in FIG. 22, a total of eight terminal electrodes 251, 252, four at each aide, are arranged at the outside of the dielectric body 212 so as to enable connection with an external circuit. That is, the multilayer capacitor 240 of the present embodiment is a multiterminal type multilayer capacitor where the adjoining terminal electrodes 251, 252 are used at opposite polarities. Specifically, the terminal electrodes are connected to an external circuit divided into a group of terminal electrodes 251 to be connected to terminal projecting parts 244A and a group of terminal electrodes 252 to be connected to terminal projecting parts 246A.

In the present embodiment as well, the internal conductor 244 connected to the terminal electrode 251 is connected to the internal conductor 248 through the linkage electrodes 253 and 254, and the internal conductor 248 functions as the same polarity as the internal conductor 244. Therefore, the path through which the current flows inside the multilayer capacitor 240 becomes longer and the ESR of the multilayer capacitor 240 is increased.

As a result, in the same way as in the fifth embodiment, the multilayer capacitor 240 according to the present embodiment can be used for various applications including that of a switching power source.

Ninth Embodiment

Next, a multilayer capacitor according to a ninth embodiment of the present invention will be explained based on FIG. 23. Members the same as members explained in the fifth embodiment are assigned the same reference numerals and overlapping explanations partially omitted.

Figure 23:
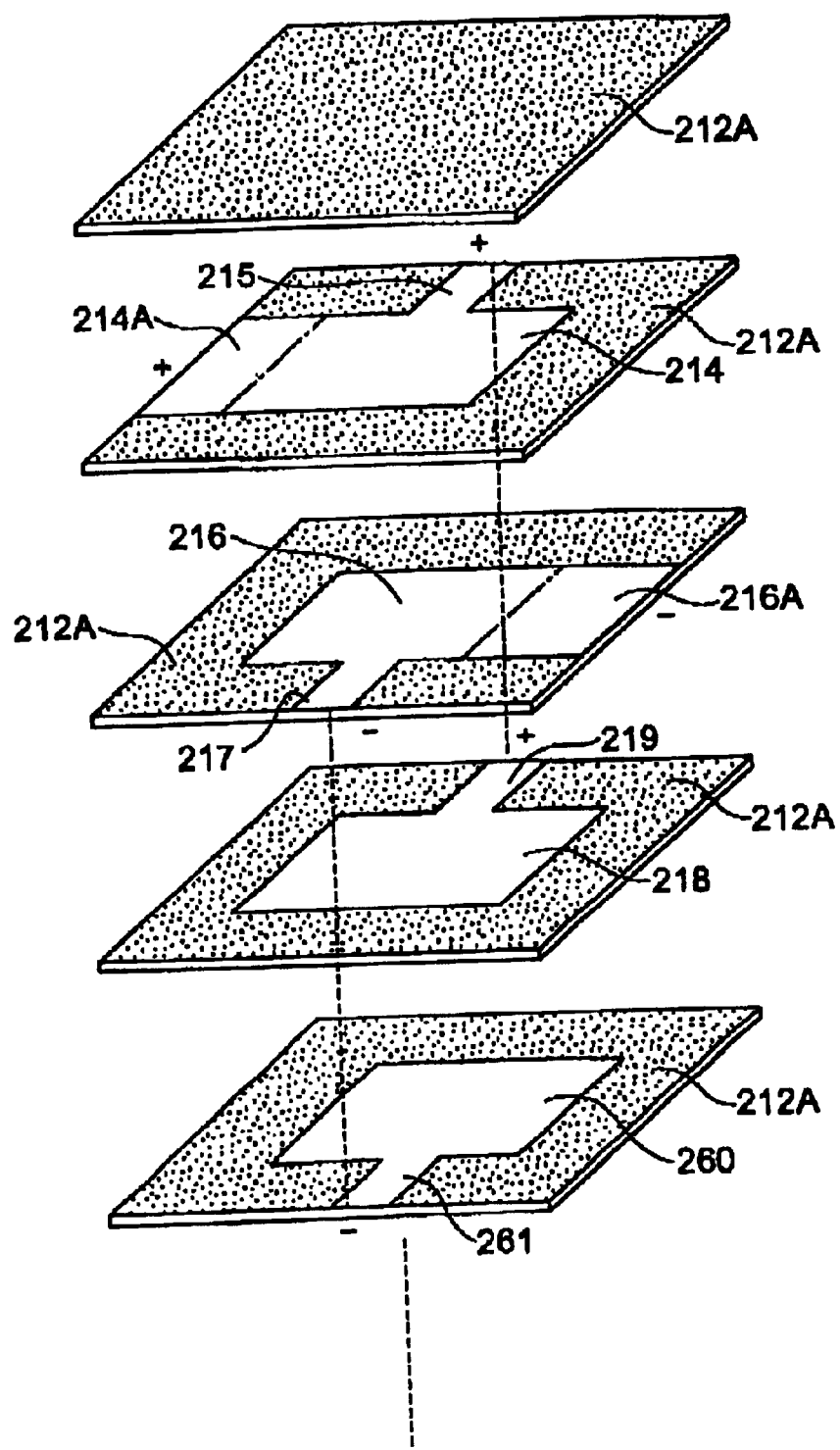
FIG. 23 is a disassembled perspective view of the inside of a multilayer capacitor according to still another embodiment of the present invention.

As shown in FIG. 23, in the present embodiment, in the same way as in the fifth embodiment, the capacitor has an internal conductor (first internal conductor) 214, an internal conductor (second internal conductor) 216, and an internal conductor (first polarity electrode) 218. In the present embodiment, however, only one connection projecting part formed at the internal conductor 214 (first linkage lead part) 215 is formed projecting out toward the end of the rear side of the ceramic layer 212A. Further, only one connection projecting part (third linkage part) 219 formed at the internal conductor 218 is formed so as to project toward the end of the rear side of the ceramic layer 212A matching with the projecting part 215.

As opposed to this, the internal conductor 216 is formed with one connection projecting part (second linkage lead part) 217 projecting toward the end of the front side of the ceramic layer 212A. Further, below the internal conductor 218 separated from the ceramic layer 212A inside the dielectric body 212, the internal conductor (second polarity electrode) 260 is formed with one connection projecting part (fourth linkage lead part) 261 projecting out toward the end of the front side of the ceramic layer 212A.

Further, in the same way as in the fifth embodiment shown in FIG. 15, in the present embodiment as well, the terminal electrodes 221 and 222 are arranged at the left and right side surfaces of the dielectric body 212. Further, the linkage electrodes 223 and 224 are arranged at the front side and rear side of the dielectric body 212. The linkage electrode (second linkage electrode) 223 connects the internal conductors 216 and 260, while the linkage electrode 224 (first linkage electrode) connects the internal conductors 214 and 218. The linkage electrode 224 (first linkage electrode) connects the internal conductors 214 and 218. These linkage electrodes 223 and 224 are arranged at the outside of the dielectric body 212.

That is, in the present embodiment, not only is the internal conductor 218 serving as the first polarity electrode connected to the internal conductor 214 connected to one terminal electrode, but also the internal conductor 260 serving as the second polarity electrode is connected to the internal conductor 216 connected to the other terminal electrode. As a result, not only is the ESR further increased, the amplitude of the control of the ESR is increased.

10th Embodiment

Next, the results of an experiment conducted to compare the impedances between the multilayer capacitor according to the fifth embodiment and a capacitor of the related art using an impedance analyzer will be shown below.

Figure 25:
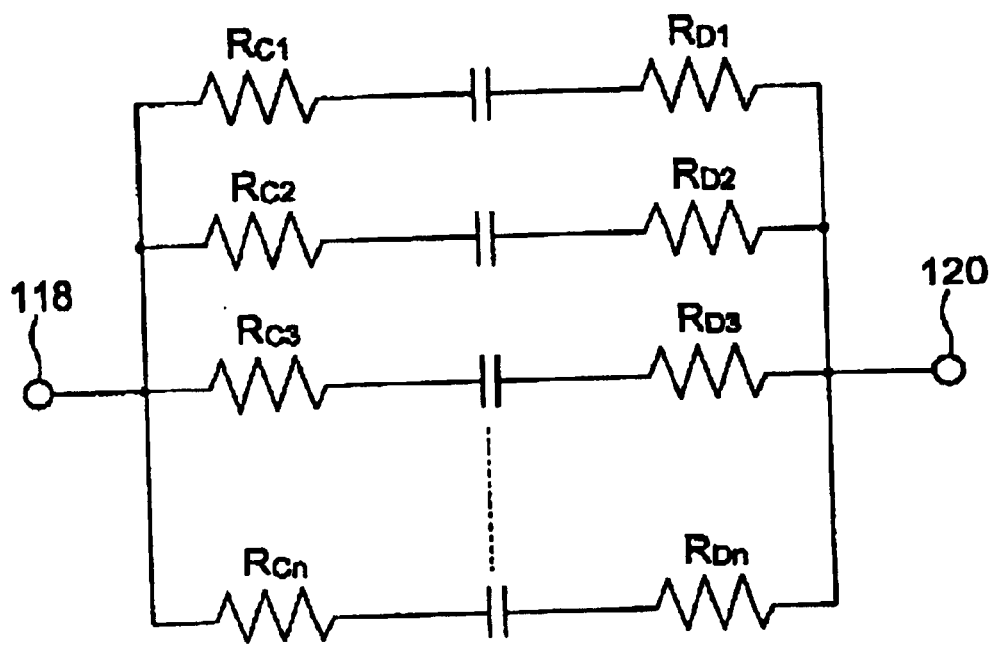
FIG. 25 is an equivalent circuit diagram of a multilayer capacitor according to the related art.

Further, as the capacitor of the related art to be compared with here, the multilayer capacitor 100 shown in FIG. 12 and FIG. 13 was used. The equivalent circuit in the multilayer capacitor 100 of the related art becomes as shown in FIG. 25. That is, the equivalent resistance of the internal conductor forming one of the electrodes of the capacitor circuit is expressed by $R_{C1}$ to $R_{CN}$, the equivalent resistance of the internal conductor forming the other electrode is expressed by $R_{D1}$ to $R_{DN}$, and n expresses the number of the internal conductor. Further, as clear from the fact that $R_{C1}$ to $R_{CN}$ and $R_{D1}$ to $R_{DN}$ are arranged in parallel, the overall ESR is reduced in inverse proportion to the number of layers.

Figure 24:
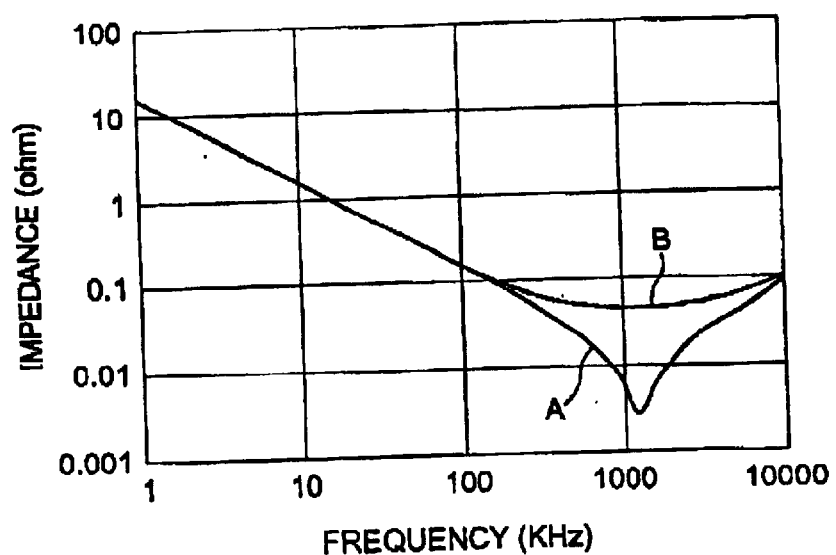
FIG. 24 is a graph of the frequency characteristics of a capacitor according to an embodiment of the present invention and a capacitor according to the related art.

The impedance characteristics of the multilayer capacitor according to the fifth embodiment and the multilayer capacitor of the related art were measured. The results are shown in FIG. 24. In the characteristic curve A showing the characteristic of the capacitor of the related art, there is a location near where the frequency exceeds 1000 kHz where the impedance drops sharply and resonance occurs, but in the characteristic curve B showing the characteristic of the multilayer capacitor 210 according to the present embodiment, there is no such location and no resonance occurs.

Further, the ESR of the samples was measured. As a result, the ESR value of the capacitor of the related art was 3.0 mÙ. As opposed to this, the ESR of the multilayer capacitor 210 according to the present embodiment was 56.5 mÙ. That is, the ESR of the multilayer capacitor 210 according to the present embodiment was confirmed to clearly increase compared with the capacitor of the related art.

Further, the value of the ESR is the value at the self resonance frequency $f_0$ shown in FIG. 9. Here, in the figure, the ESR is the equal serial impedance, while C is the electrostatic capacity. Further, the capacitors used in the experiment are the 3216 Type given electrostatic capacities of 10 μF. Here, the "3216 Type" means a capacitor of a vertical dimension of 3.2 mm and a horizontal dimension of 1.6 mm.

Note that the present invention is not limited to the above embodiments and can be modified in various ways within the scope of the present invention.

For example, the number of the internal conductors (including internal electrodes and same polarity electrodes) is not limited to the numbers of the multilayer capacitors according to the above embodiments. The number can be made further greater. Further, it is also possible to change the order of the internal conductors in the stacking method in any manner. Still further, the structure of the internal conductors is not limited to those explained in the above embodiments. For example, it is also possible to further increase the number of the terminal electrodes and make the number of notches four or more.

What is claimed is:

1. A multilayer capacitor comprising of
   at least two of a first internal conductor and a second internal conductor formed in flat shapes,
   at least two of a first polarity conductor and a second polarity conductor formed in flat shapes,
   a dielectric body formed by stacking a plurality of dielectric sheets with dielectric sheets sandwiching each of the conductors,
   a first terminal electrode arranged at an outside of said dielectric body so as to be able to be connected to an external circuit and connected to said first internal conductor,
   a second terminal electrode arranged at the outside of said dielectric body so as to be able to be connected to said external circuit and connected to said second internal conductor,
   a first linkage electrode for connecting said first internal conductor and said first polarity conductor at the outside of said dielectric body while creating portions where the directions of currents between the conductors adjoining each other along a stacking direction become opposite to each other, and
   a second linkage electrode for connecting said second internal conductor and said second polarity conductor at the outside of said dielectric body while creating portions where the directions of currents between the conductors adjoining each other along the stacking direction become opposite to each other.

2. The multilayer capacitor as set forth in claim 1, wherein said first internal conductor is formed with a first linkage lead part for connecting with said first linkage electrode separate from a first terminal lead part for connecting with said first terminal electrode,
   said second internal conductor is formed with a second linkage lead part for connecting with said second linkage electrode separate from a second terminal lead part for connecting with said second terminal electrode,
   said first polarity conductor is formed with a third linkage lead part for connecting with said first linkage electrode, and
   said second polarity conductor is formed with a fourth linkage lead part for connecting with said second linkage electrode.

3. The multilayer capacitor as set forth in claim 1, wherein said second polarity conductor is arranged between said first internal conductor and said first polarity conductor through said electric sheets, and
   said first polarity conductor is arranged between said second polarity conductor and said second internal conductor.

4. The multilayer capacitor as set forth in claim 1, wherein a plurality of said first and second internal conductors and said first and second polarity conductors are formed in the stacking direction through said dielectric sheets.

5. A multilayer capacitor comprising:
   at least two of a first internal conductor and second internal conductor formed in flat shapes,
   a plurality of first polarity conductors formed in flat shapes,
   a plurality of second polarity conductors formed in flat shapes,
   a dielectric body formed by stacking a plurality of dielectric sheets with dielectric sheets sandwiching each of the conductors,
   a first terminal electrode arranged at an outside of said dielectric body so as to enable connection to an external circuit and connected to said first internal conductor,
   a second terminal electrode arranged at the outside of said dielectric body so as to enable connection to the external circuit and connected to said second internal conductor,
   a first linkage electrode for connecting said first internal conductor and one of said first polarity conductors at the outside of said dielectric body while creating portions where the directions of currents between the conductors adjoining each other along a stacking direction become opposite to each other,
   a second linkage electrode for connecting said second internal conductor and one of said second polarity conductors at the outside of said dielectric body while creating portions where the directions of currents between the conductors adjoining each other along the stacking direction become opposite to each other, a first intermediate linkage electrode for connecting said first polarity conductors at the outside of said dielectric body while creating portions where the directions of currents between the conductors adjoining each other along the stacking direction become opposite to each other, and a second intermediate linkage electrode for connecting said second polarity conductors at the outside of said dielectric body while creating portions where the directions of currents between the conductors adjoining each other along the stacking direction become opposite to each other.

6. The multilayer capacitor as set forth in claim 5, wherein said first internal conductor, said second internal conductor, said first polarity conductors, and said second polarity conductors are formed with lead parts for connection with any of said first terminal electrode, second terminal electrode, first linkage electrode, second linkage electrode, first intermediate linkage electrode, and/or second intermediate linkage electrode.

7. The multilayer capacitor as set forth in claim 1, wherein at least one of said first internal conductor and second internal conductor is comprised of at least two split conductors insulated from each other on the same flat surface, and these split conductors are connected to a wide first linkage electrode or wide second linkage electrode.

8. A multilayer capacitor comprising:

a dielectric body formed by stacking dielectric layers, at least one pair of a first terminal electrode and second terminal electrode arranged at an outside of said dielectric body and able to be connected to an external circuit, a first internal conductor arranged in a flat shape inside said dielectric body and connected to said first terminal electrode, a second internal conductor arranged in a flat shape inside said dielectric body so as not to be connected to said first internal conductor and connected to said second terminal electrode, at least one first polarity conductor arranged inside said dielectric body while being separated from said first internal conductor and said second internal conductor by said dielectric layers, and a first linkage electrode arranged at the outside of said dielectric body and connecting said first internal conductor and said first polarity conductor.

9. The multilayer capacitor as set forth in claim 8, wherein said capacitor further comprises, separate from said first polarity conductor, a second polarity conductor arranged inside said dielectric body while being separated from said first internal conductor and said second internal conductor by said dielectric layers, and a second linkage electrode connecting said second internal conductor and said second polarity conductor in formed at the outside of said dielectric body.

10. The multilayer capacitor as set forth in claim 8, wherein said first internal conductor is formed with a first terminal lead part for connection with said first terminal electrode and is formed with a first linkage lead part for connection with said first linkage electrode.

11. The multilayer capacitor as set forth in claim 9, wherein said second internal conductor is formed with a second terminal lead part for connection with said second terminal electrode and is formed with a second linkage lead part for connection with said second linkage electrode.

12. The multilayer capacitor as set forth in claim 10, wherein said first polarity conductor is formed with a third linkage lead part for connection with said first linkage electrode.

13. The multilayer capacitor as set forth in claim 11, wherein said second polarity conductor is formed with a fourth linkage lead part for connection with said second linkage electrode.

14. The multilayer capacitor as set forth in claim 8, wherein a plurality of said first internal conductors and second internal conductors are formed inside said dielectric body.

15. The multilayer capacitor as set forth in claim 8, wherein a notch formed in said first internal conductor and/or second internal conductor.

16. The multilayer capacitor as set forth in claim 8, wherein said first internal conductor and said first polarity conductor are connected by a plurality of said first linkage electrodes.

17. The multilayer capacitor as set forth in claim 8, wherein a plurality of said first terminal electrodes and a plurality of said second terminal electrodes are provided at the outside of said dielectric body, said first internal conductor is formed with a plurality of first terminal lead parts for connection to said plurality of first terminal electrodes, and said second internal conductor is formed with a plurality of second terminal lead parts for connection to said plurality of second terminal electrodes.

18. The multilayer capacitor as set forth in claim 10, wherein the width of at least part of said first internal conductor other than at said first terminal lead part is narrower than the width of said first terminal lead part.

19. A multilayer capacitor comprising:

a dielectric body formed by stacking dielectric sheets, a pair of a first terminal electrode and second terminal electrode arranged at an outside of said dielectric body and insulated from each other, at least one first linkage electrode arranged at the outside of said dielectric body and insulated from said first terminal electrode and second terminal electrode, a first internal electrode stacked inside said dielectric body through said dielectric sheets and connected to said first terminal electrode, a second internal electrode stacked inside said dielectric body through said dielectric sheets and connected to said second terminal electrode, and a first polarity conductor stacked inside said dielectric body through said dielectric sheets, connected to said first linkage electrode so as to be connected to said first internal electrode.

* * * * *